(12) United States Patent
Yamamoto et al.

(10) Patent No.: US 11,760,244 B2
(45) Date of Patent: Sep. 19, 2023

(54) ARMREST

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); SUMITOMO RIKO COMPANY LIMITED, Aichi (JP); TOKAI CHEMICAL INDUSTRIES, LTD., Gifu (JP)

(72) Inventors: Satoshi Yamamoto, Mie (JP); Kaho Hayashi, Mie (JP); Hideki Oshima, Aichi (JP); Takemasa Okumura, Gifu (JP); Takahiko Endo, Gifu (JP); Jun Jin, Gifu (JP); Keiji Makino, Gifu (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); SUMITOMO RIKO COMPANY LIMITED, Aichi (JP); TOKAI CHEMICAL INDUSTRIES, LTD., Gifu (JP)

( * ) Notice: Subject to any disclaimer, the term of this patent is extended or adjusted under 35 U.S.C. 154(b) by 120 days.

(21) Appl. No.: 17/437,530

(22) PCT Filed: Mar. 3, 2020

(86) PCT No.: PCT/JP2020/008824
§ 371 (c)(1),
(2) Date: Sep. 9, 2021

(87) PCT Pub. No.: WO2020/184274
PCT Pub. Date: Sep. 17, 2020

(65) Prior Publication Data
US 2022/0250519 A1    Aug. 11, 2022

(30) Foreign Application Priority Data

Mar. 11, 2019   (JP) .................. 2019-044038

(51) Int. Cl.
*B60N 2/75*       (2018.01)
*B60N 3/00*       (2006.01)

(52) U.S. Cl.
CPC ............... *B60N 2/767* (2018.02); *B60N 3/00* (2013.01)

(58) Field of Classification Search
CPC .......... B60N 2/767; B60N 2/797; B60N 2/79; B60N 3/00
See application file for complete search history.

(56) References Cited

U.S. PATENT DOCUMENTS

| | | | | |
|---|---|---|---|---|
| 4,653,799 A | * | 3/1987 | Arai ......................... | B60J 5/047 49/248 |
| 5,924,515 A | * | 7/1999 | Stauffer ................. | A01D 67/04 180/326 |

(Continued)

FOREIGN PATENT DOCUMENTS

| | | |
|---|---|---|
| JP | 2001-045641 | 2/2001 |
| JP | 2016-107686 | 6/2016 |

(Continued)

OTHER PUBLICATIONS

International Search Report in International application No. PCT/JP2020/008824, dated May 19, 2020, along with an English translation thereof.

*Primary Examiner* — Philip F Gabler
(74) *Attorney, Agent, or Firm* — Greenblum & Bernstein, P.L.C.

(57) ABSTRACT

An armrest includes a frame, a mounting portion included in the frame and having a mounting surface with which the mounting portion is mounted on a bracket of a seat, an (Continued)

armrest-side wire harness arranged in the frame, and an armrest-side connector connected to the armrest-side wire harness and being open in a direction from the mounting surface toward the bracket.

8 Claims, 27 Drawing Sheets

(56) References Cited

U.S. PATENT DOCUMENTS

| | | | | |
|---|---|---|---|---|
| 8,636,570 B2* | 1/2014 | Tastad | ................... | A47C 7/727 |
| | | | | 463/47 |
| 11,186,211 B2* | 11/2021 | Yamamoto | ............. | B60N 2/753 |
| 11,266,248 B2* | 3/2022 | Yamamoto | ............. | B60N 2/753 |
| 11,299,078 B2* | 4/2022 | Yamamoto | ............... | A47C 7/54 |
| 11,382,811 B2* | 7/2022 | Paul | ........................ | A61G 5/14 |
| 2020/0247273 A1* | 8/2020 | Heath | ................... | B60N 3/063 |

FOREIGN PATENT DOCUMENTS

| | | |
|---|---|---|
| JP | 2018-069777 | 5/2018 |
| JP | 2018-199409 | 12/2018 |

* cited by examiner

FIG.25

ARMREST

TECHNICAL FIELD

The technology disclosed herein relates to an armrest.

BACKGROUND ART

An armrest described in Japanese Unexamined Patent Application Publication No. 2016-107686 has been known as an armrest that is to be installed in a vehicle. Such an armrest is mounted on a console of the vehicle. The armrest includes a box-shaped housing member in which a connection cord is arranged. A connection terminal that is attached to an end portion of the connection cord is connected to a socket such as an USB socket.

The armrest of the above related art is mounted on the console. With such a configuration, the wire harness for supplying power to the socket is routed from a vehicle body to the inside of the armrest through the console.

RELATED ART DOCUMENT

Patent Document

[Patent Document 1] Japanese Unexamined Patent Application Publication No. 2016-107686

SUMMARY OF THE INVENTION

Problem to be Solved by the Invention

Unlike the prior art, the armrest may be mounted on a component, which is different from the console, such as a side surface of the seat. In such a configuration, the wire harness may not be connected to the armrest easily. Specifically, in mounting the armrest on the side surface of the seat and pulling out the wire harness outward from the side surface of the seat and inserting the wire harness in the armrest, it is not clear how to perform a process of mounting the armrest on the seat and a process of connecting the seat and the armrest with the wire harness.

For example, after the seat-side connector that is connected to the end portion of the wire harness extending from the seat is connected to the armrest-side connector that is connected to the end portion of the wire harness extending from the armrest, the armrest may be mounted on the seat. In performing such processes, it may be difficult to keep a space that corresponds to a stroke length of the wire harness and is enough for coupling the seat-side connector and the armrest-side connector. Furthermore, it is not clear how to deal with the wire harness having a length corresponding to at least the stroke length after the armrest is mounted on the seat.

The technology described herein was made in view of the above circumstances. An object is to provide an armrest that improves operability of connecting an armrest-side wire harness routed in the armrest to another wire harness.

Means for Solving the Problem

The technology disclosed herein is an armrest that includes a frame, a mounting portion included in the frame and having a mounting surface with which the mounting portion is mounted on a mount member, an armrest-side wire harness arranged in the frame, and an armrest-side connector connected to the armrest-side wire harness and being open in a direction from the mounting surface toward the mount member.

According to the above configuration, after the mounting portion is attached to the mount member, the armrest-side connector, which is open in a direction from the mounting surface toward the mount member, and the seat-side connector, which is connected to the wire harness arranged on the mount member, are connected to each other. This improves operability of connection to the armrest-side wire harness in the armrest.

Embodiments of the technology described herein may preferably include configurations as follows.

The frame may further include a protector that projects from the mounting surface toward the mount member. The armrest-side wire harness may be arranged in the protector and the armrest-side connector may be attached to a projecting end portion of the protector.

According to the above configuration, the protector protects the armrest-side wire harness that extends toward the mount member.

The protector may be preferably made of metal.

According to the above configuration, the protector is increased in strength compared to the protector made of synthetic resin. Therefore, the armrest-side wire harness can be surely protected.

The protector may have a cross-sectional area taken along a surface thereof that is perpendicular to a projecting direction of the protector and the cross-sectional area of the protector may be smaller than a cross-sectional area of the armrest-side connector.

According to the above configuration, a portion through which the protector and the armrest-side connector are inserted has a cross-sectional area greater than a cross-sectional area of the armrest-side connector. A portion through which only the protector can be inserted has a cross-sectional area greater than a cross-sectional area of the protector and smaller than that of the armrest-side connector. According to such a configuration, in the configuration that the armrest is rotatably mounted on the mount member, the cross-sectional area of the through hole in the mount member can be reduced compared to a configuration including the protector and the armrest-side connector both having the same cross-sectional area. This increases the strength of the mount member.

The protector may include a bottom wall and two side walls extending upward from side edges of the bottom wall, respectively. One of the two side walls may include a stopper piece extending from a distal end of the one of the two side walls toward another one of the two side walls and holding the armrest-side wire harness such that the armrest-side wire harness is less likely to come off from the protector.

According to the above configuration, the bottom wall and the two side walls surely protect the armrest-side wire harness. The stopper piece suppresses the armrest-side wire harness from coming off from the protector and the armrest-side wire harness is surely protected.

The technology described herein is an armrest to be mounted on a seat of a vehicle and the armrest includes a frame, a mounting portion included in the frame and having a mounting surface with which the mounting portion is mounted on a bracket of the seat, an armrest-side wire harness arranged in the frame, and an armrest-side connector connected to the armrest-side wire harness and being open in a direction from the mounting surface toward the bracket.

According to the above configuration, after the mounting portion is attached to the bracket of the seat, the armrest-side connector, which is open in a direction from the mounting surface toward the bracket, and the seat-side connector, which is connected to the seat-side wire harness arranged in the seat, are connected to each other inside the seat. This improves operability of connecting the wire harness to the armrest.

Embodiments of the technology described herein may preferably include configurations as follows.

The frame may further include a protector that projects from the mounting surface toward the bracket and is inserted in the seat while the mounting surface being attached to the bracket. The armrest-side wire harness may be arranged in the protector and the armrest-side connector may be attached to a projecting end portion of the protector.

According to the above configuration, the armrest-side connector can be surely arranged inside the seat while the mounting portion being attached to the bracket of the seat. Accordingly, the seat-side wire harness and the armrest-side wire harness can be surely connected to each other inside the seat. This further improves operability of connecting the wire harness to the armrest.

The armrest-side wire harness can be protected by the protector that projects toward the bracket and is inserted into the seat.

The protector may have a cross-sectional area taken along a surface thereof that is perpendicular to a projecting direction of the protector and the cross-sectional area of the protector may be smaller than a cross-sectional area of the connector.

According to the above configuration, the bracket can be increased in strength and the reasons thereof will be described below. The bracket of the seat includes the through hole through which the protector and the armrest-side connector are to be inserted. The through hole includes a portion through which the protector and the armrest-side connector can be inserted and the portion has a cross-sectional area greater than a cross-sectional area of the armrest-side connector. The through hole further includes a portion through which only the protector can be inserted and the portion has a cross-sectional area greater than a cross-sectional area of the protector and smaller than that of the armrest-side connector. According to such a configuration, in the configuration that the armrest is rotatably mounted on the bracket, the cross-sectional area of the through hole in the bracket can be reduced compared to a configuration including the protector and the armrest-side connector both having the same cross-sectional area. This increases the strength of the bracket.

Advantageous Effects of the Invention

According to the technology disclosed herein, operability of connecting an armrest-side wire harness routed in an armrest to another wire harness can be improved.

BRIEF DESCRIPTION OF THE DRAWINGS

Figure 25:
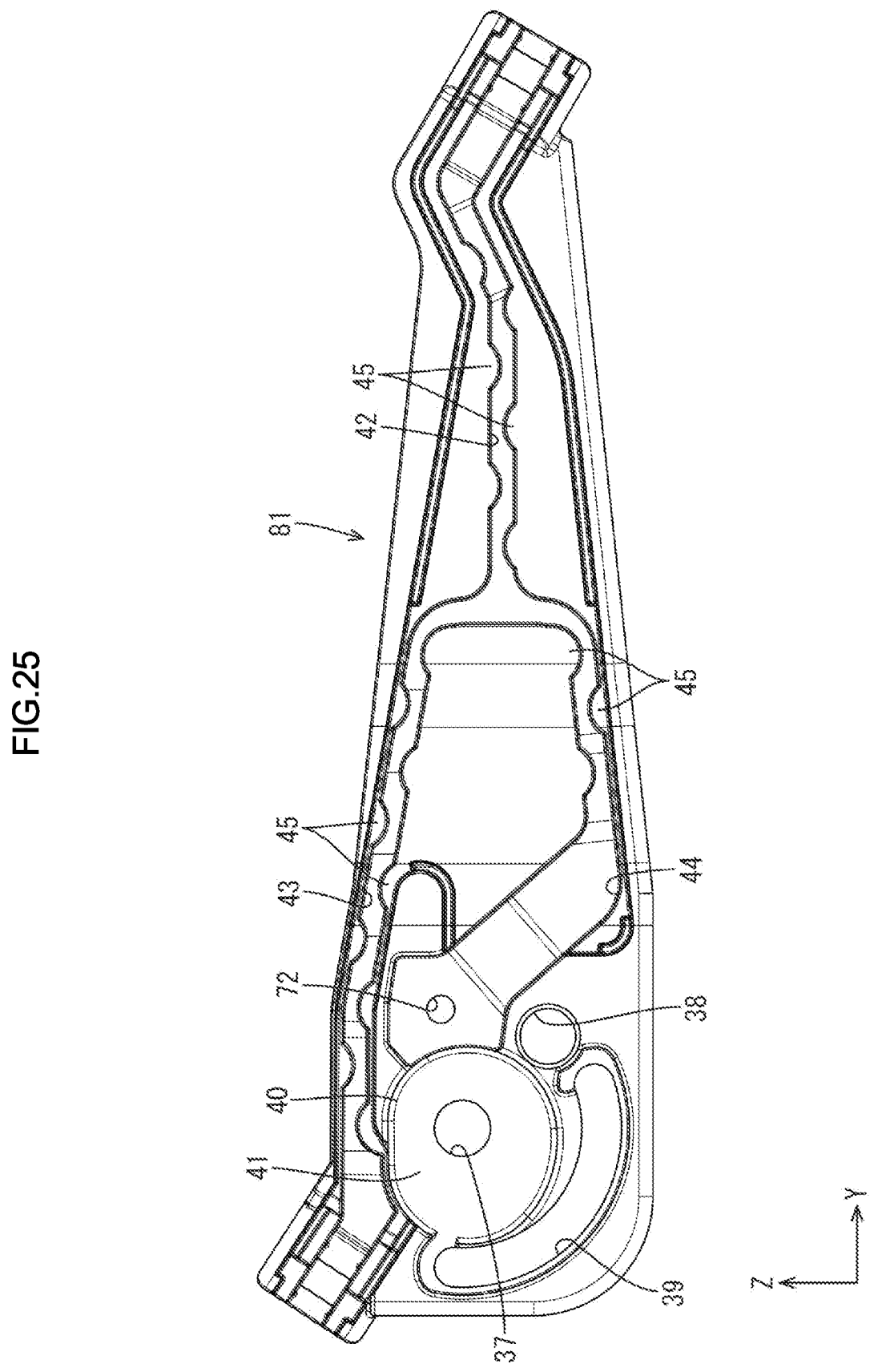

FIG. 25 is a side view illustrating a frame.

MODES FOR CARRYING OUT THE INVENTION

First Embodiment

A first embodiment of the technology described herein will be described with reference to FIGS. 1 to 20. An armrest 10 according to this embodiment is mounted on a side section of a seat 11 of a vehicle, which is not illustrated. The armrest 10 includes a frame 12 and an armrest-side wire harness that is routed inside the frame 12. In the following description, a Z-direction, a Y-direction, and an X-direction correspond to an upper side, a front side, and a left side, respectively. One of the same components is indicated by a symbol and other ones may not be indicated by the symbols.

Seat 11

Figure 1:
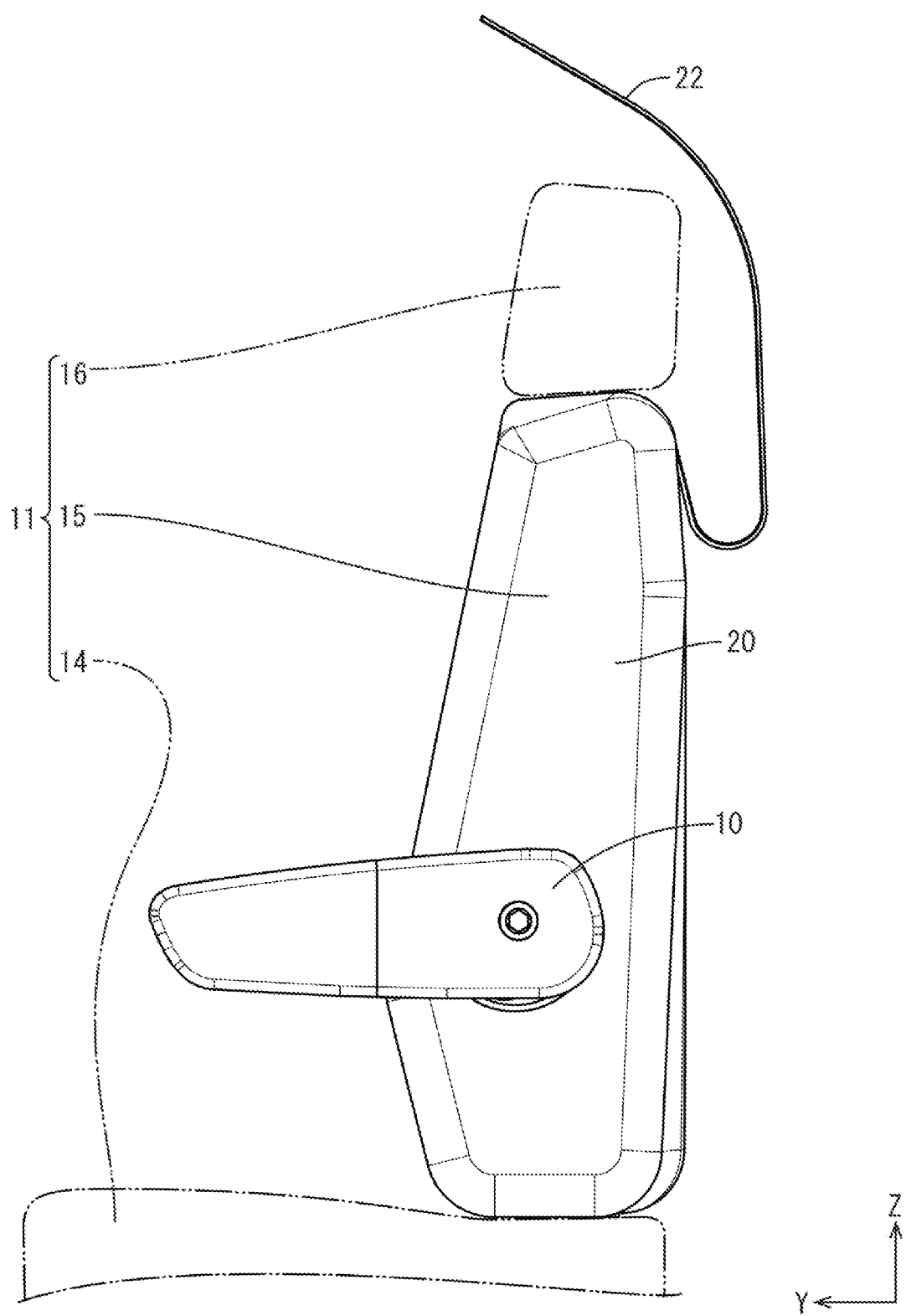
FIG. 1 is a side view illustrating an armrest according to a first embodiment that is mounted on a seat.
Figure 2:
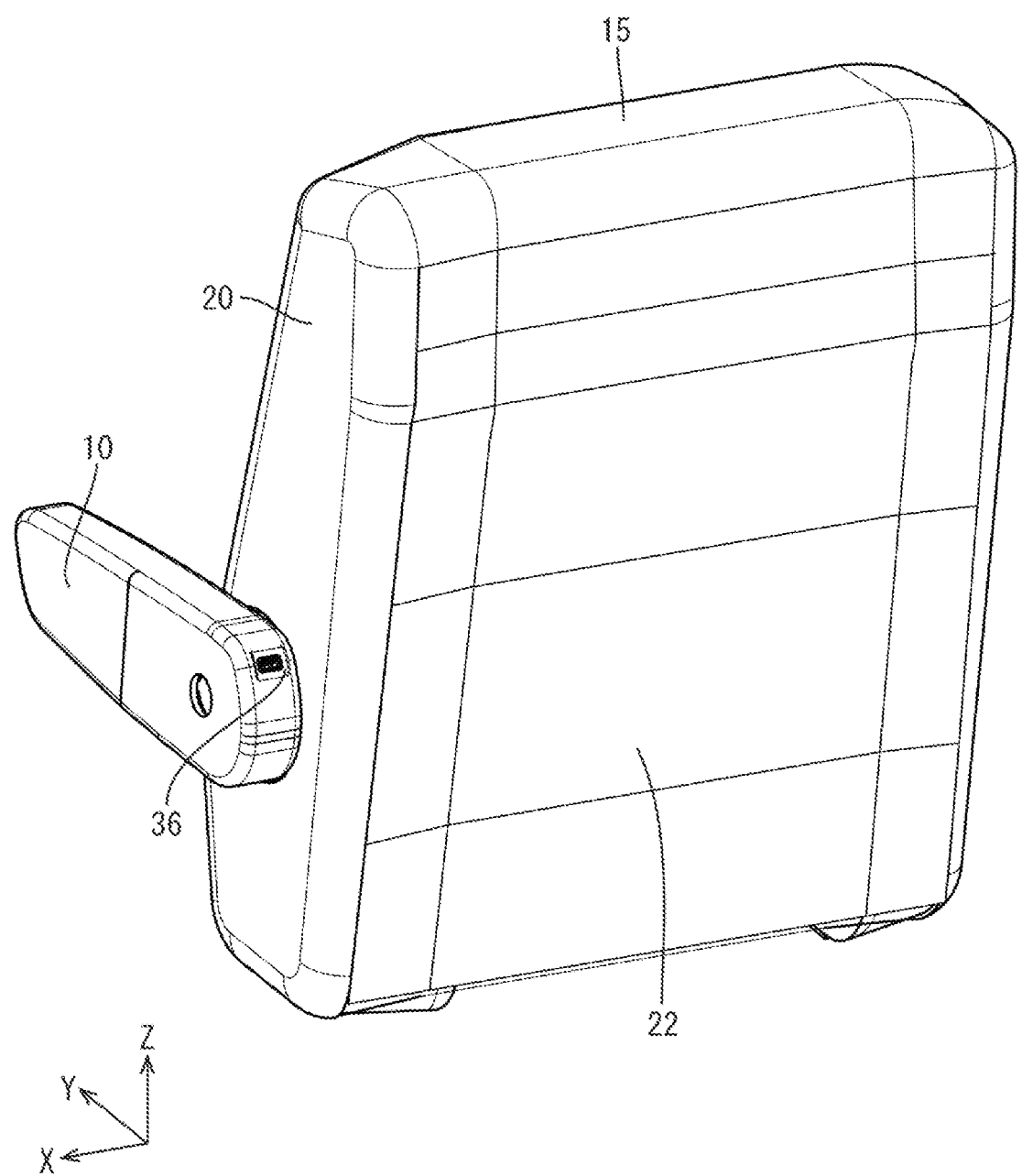
FIG. 2 is a perspective view illustrating a backrest in which an opening hole thereof is closed with a back cover.
Figure 3:
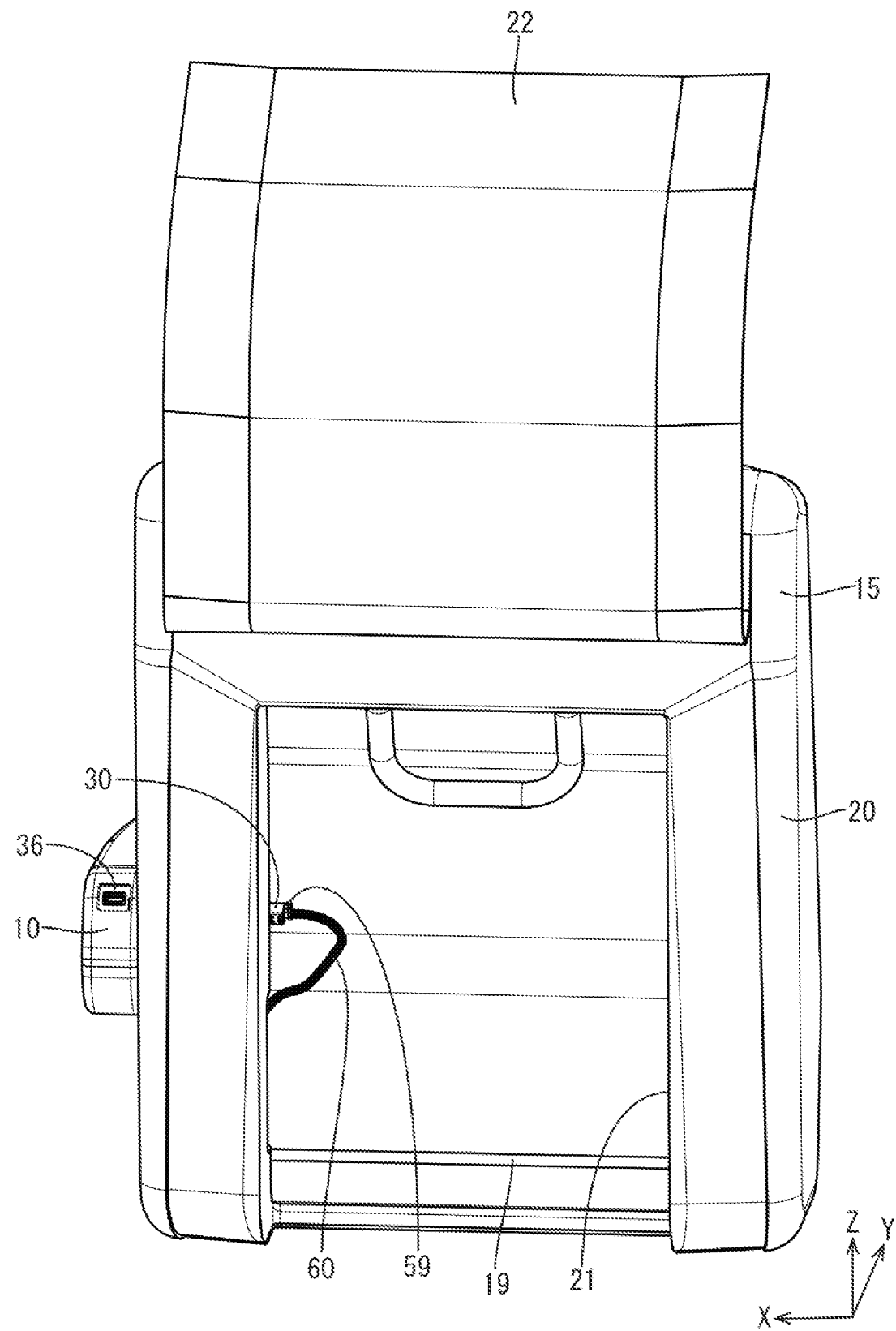
FIG. 3 is a perspective view illustrating the backrest in which the back cover is lifted upward and the opening hole is open.

As illustrated in FIG. 1, the seat 11 includes a seat base 14, a backrest 15 extending upward from a rear end section of the seat base 14, and a headrest 16 attached to an upper end section of the backrest 15. The backrest 15 includes a seat frame 17 made of metal within the backrest 15. Although configurations are not specifically illustrated, the seat frame 17 includes main frames 18 on right and left sides thereof and a connection frame 19. The main frames 18 extend vertically. The connection frame 19 connects lower end portions of the main frames 18. The seat frame 17 is covered with a seat cover 20 made of fabric, synthetic leather, or natural leather.

As illustrated in FIG. 1, the seat cover 20 includes an opening hole 21 on a rear surface thereof and the opening hole 21 is open rearward. A back cover 22 is fixed to an upper edge portion of the seat cover 20 that is above the opening hole 21. The back cover 22 extends downward from the upper edge portion. The back cover 22 is fixed to the seat cover 20 such that the opening hole 21 is uncovered and covered with the back cover 22 by opening and closing a known fastener (not illustrated). Specifically, the opening hole 21 is covered with the back cover 22 by closing the fastener (see FIG. 2) and the opening hole 21 is opened by opening the fastener and lifting up the back cover 22 (see FIG. 3).

Figure 4:
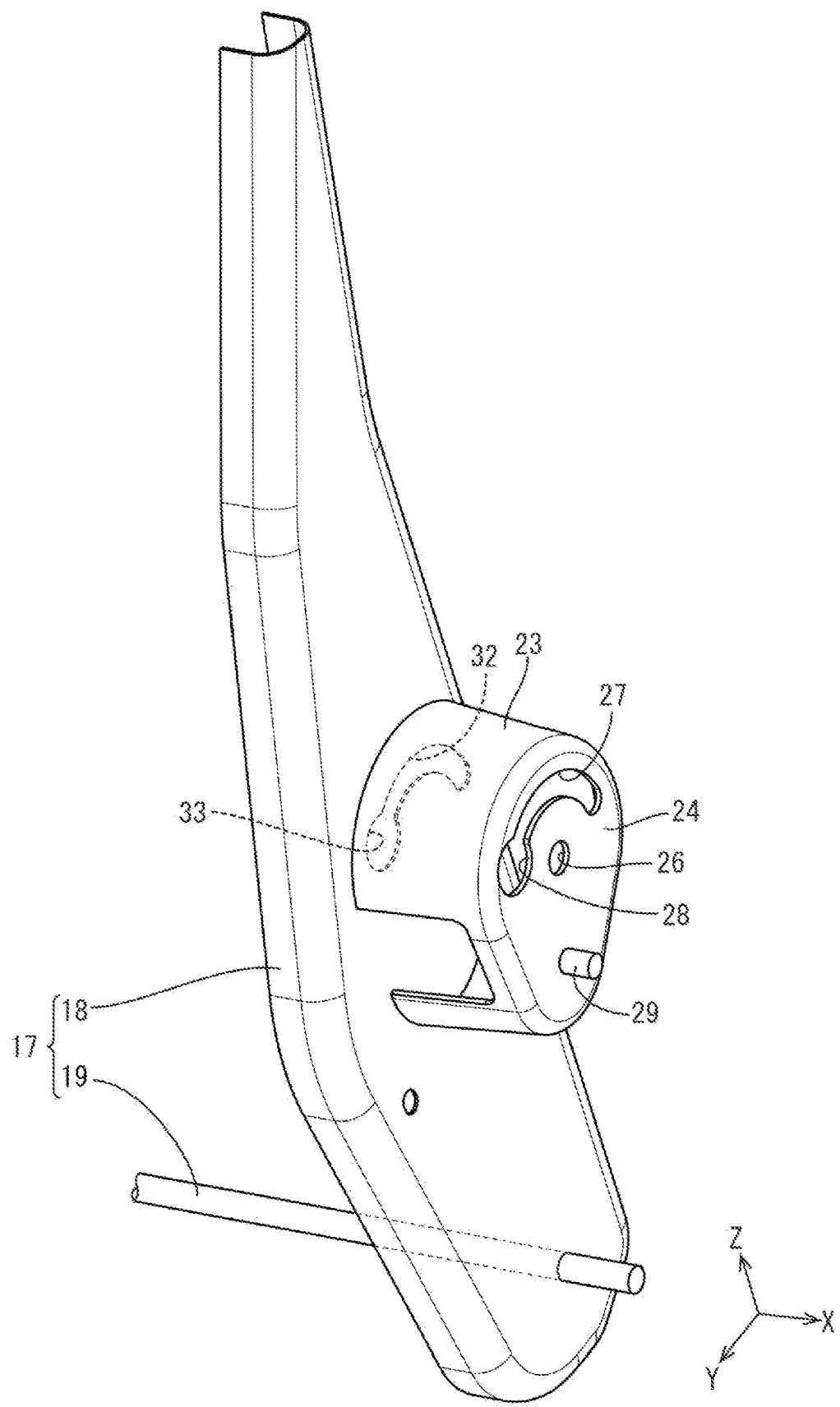
FIG. 4 is an enlarged perspective view illustrating portions of a main frame and a bracket.

As illustrated in FIG. 4, a bracket 23 (one example of a mount member) is fixed to an outer surface of a left side portion of the main frame 18 with respect to a right-left direction. The bracket 23 is fixed to the main frame 18 with a known method such as welding, screwing with bolts or other methods.

Bracket 23

Figure 5:
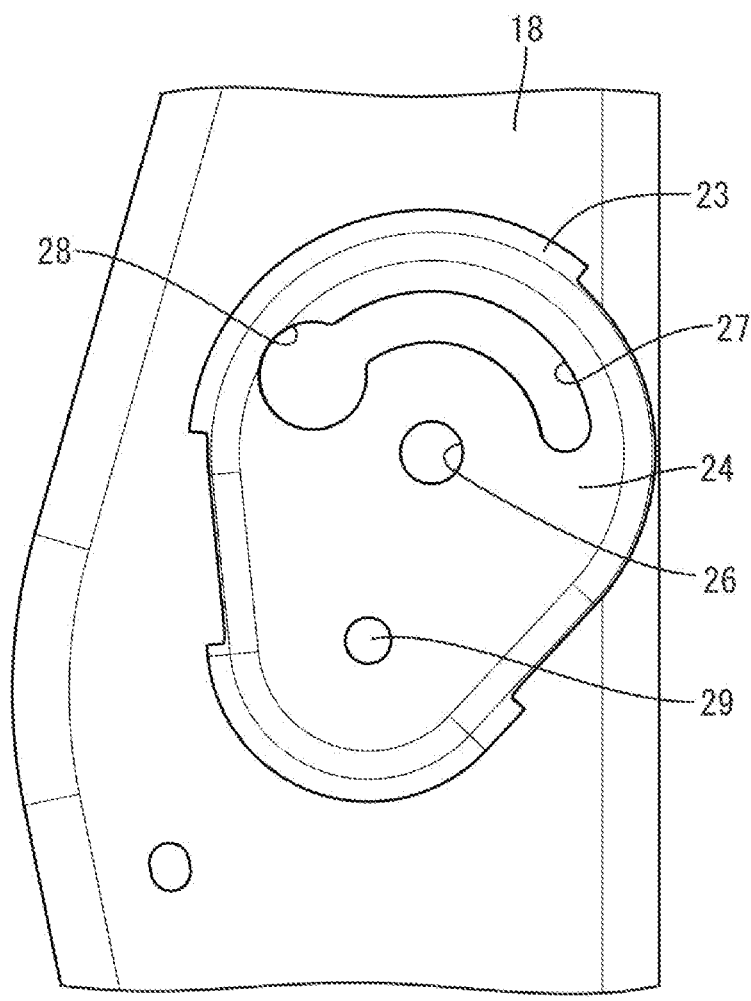
FIG. 5 is an enlarged side view illustrating portions of the main frame and the bracket.

As illustrated in FIG. 5, the bracket 23 is obtained by pressing a metal plate into a predefined shape. The bracket 23 has a substantially box shape that is open inward with respect to the right-left direction. The bracket 23 is wide with respect to a front-rear direction at an upper section thereof and is narrow with respect to the front-rear direction at a lower section thereof and has a droplet shape that is turned up side down seen from the right-left direction. The bracket 23 includes a mount wall 24 that is opposite the main frame 18.

Figure 6:
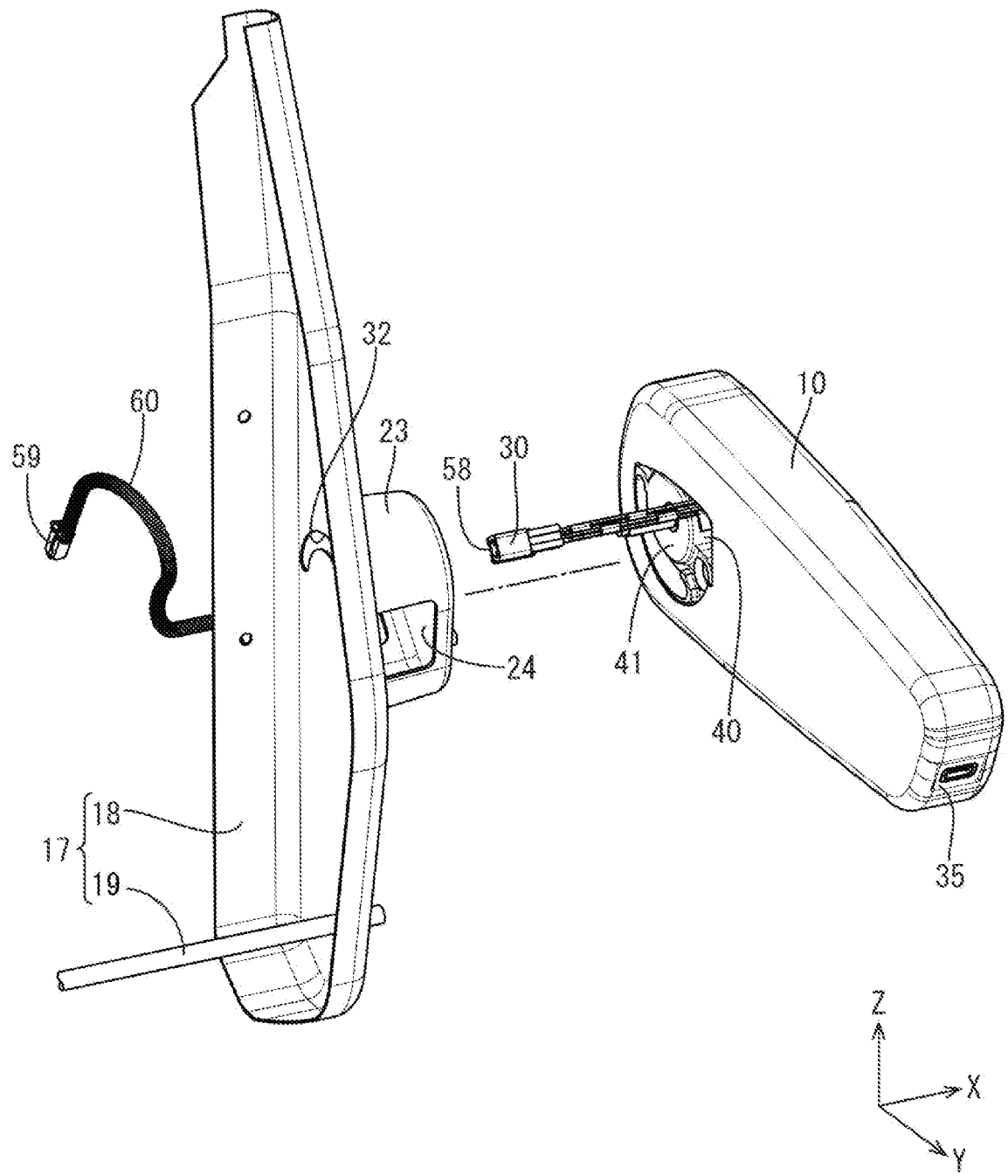
FIG. 6 is an enlarged perspective view illustrating the armrest and the bracket before the armrest is mounted on the bracket.
Figure 7:
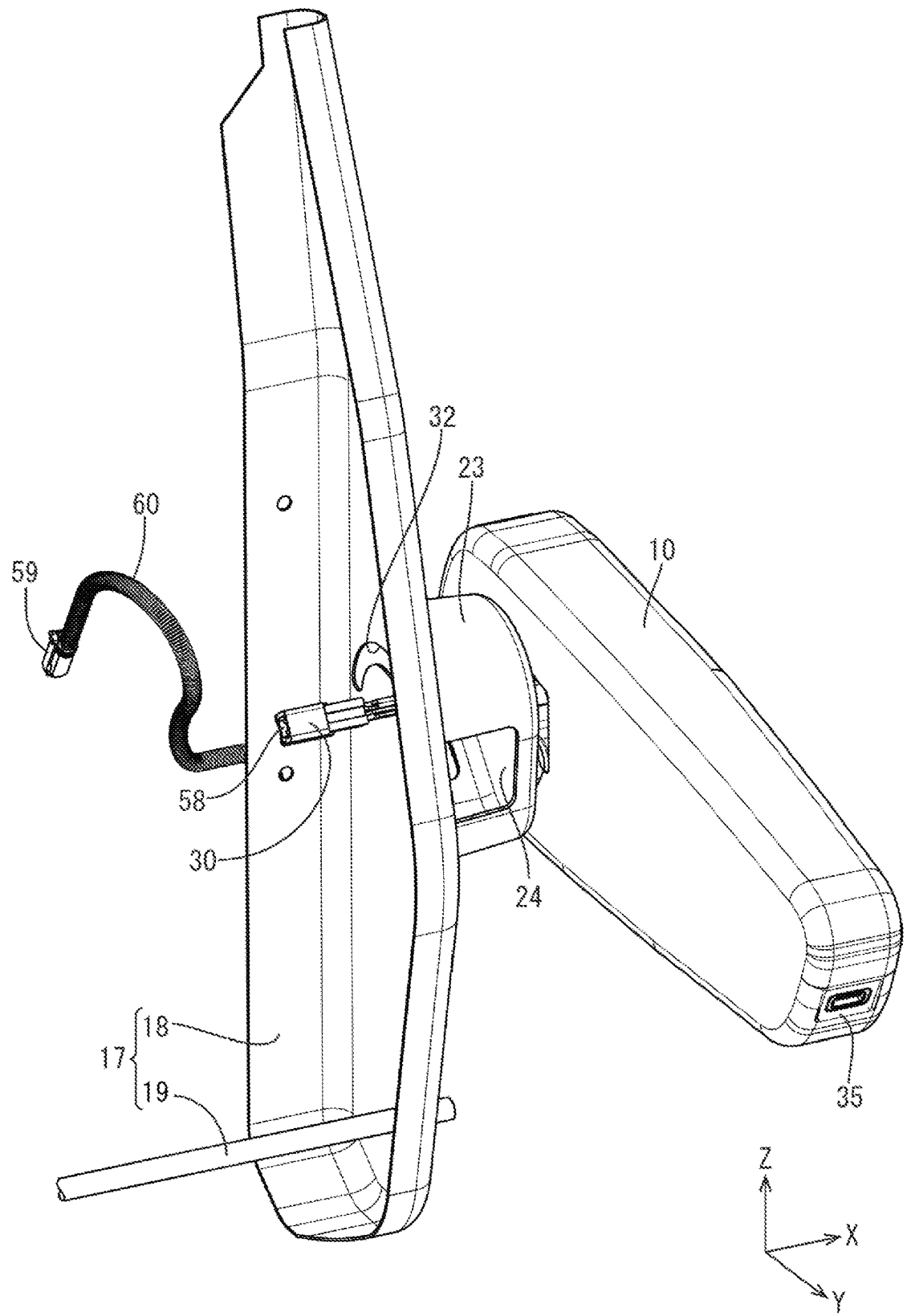
FIG. 7 is an enlarged perspective view illustrating the armrest and the bracket after the armrest is mounted on the bracket.

As illustrated in FIGS. 6 and 7, the armrest 10 is attached to a surface of the mount wall 24 that is an opposite surface from the one facing the main frame 18. As illustrated in FIG. 5, the mount wall 24 includes a bolt hole 26 that is through the mount wall 24 with respect to the right-left direction. A bolt 25 is inserted through the bolt hole 26 to connect the armrest 10 and the bracket 23 so as to be rotatable with each other. The mount wall 24 includes a bracket-side long hole 27 in an upper edge section thereof. The bracket-side long hole 27 is through the mount wall 24 in the right-left direction. The bracket-side long hole 27 has a substantially arched shape curved around the bolt hole 26. The bracket-side long hole 27 has a large circular portion 28 at a front end section thereof. The large circular portion 28 is a circular hole that is greater than other section of the bracket-side long hole 27. The mount wall 24 includes a guide pin 29 on a lower edge section thereof and the guide pin 29 projects outward in the right-left direction. The guide pin 29 has a circular columnar shape.

The large circular portion 28 of the bracket 23 has an inner diameter that is greater than an outline dimension of an armrest-side connector 30, which will be described later. The section of the bracket-side long hole 27 other than the large circular portion 28 has a width dimension that is greater than an outer diameter dimension of a protector 31, which will be described later, and smaller than the outline dimension of the armrest-side connector 30.

Figure 8:
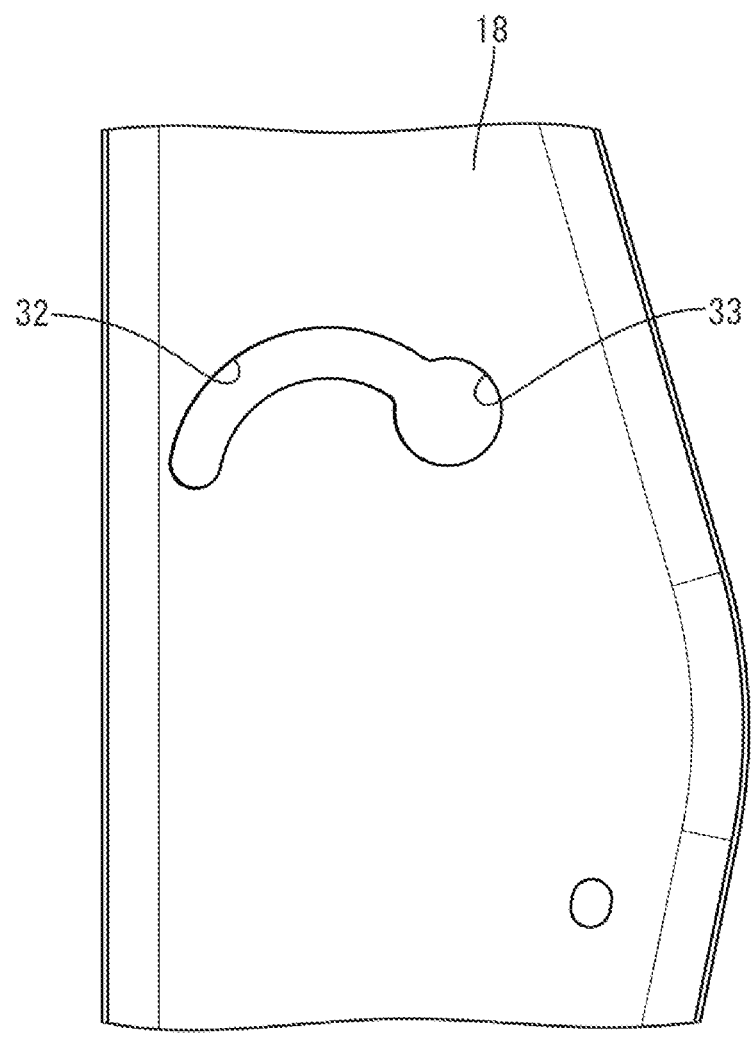
FIG. 8 is an enlarged side view illustrating the main frame including a main frame-side long hole.

As illustrated in FIG. 4, the main frame 18 includes a main frame-side long hole 32 at a portion corresponding to the bracket-side long hole 27 of the bracket 23 with respect to the right-left direction. As illustrated in FIG. 8, the main frame-side long hole 32 has a substantially same shape as that of the bracket-side long hole 27. The main frame-side long hole 32 has a large circular hole 33 at a front end section thereof and the large circular hole 33 is a circular hole that is greater than other section of the main frame-side long hole 32.

The large circular portion 33 of the main frame 18 has an inner diameter that is greater than the outline dimension of the armrest-side connector 30. The section of the main frame-side long hole 32 other than the large circular portion 33 has a width dimension that is greater than the outer diameter dimension of the protector 31 and smaller than the outline dimension of the armrest-side connector 30.

Armrest 10

Figure 9:
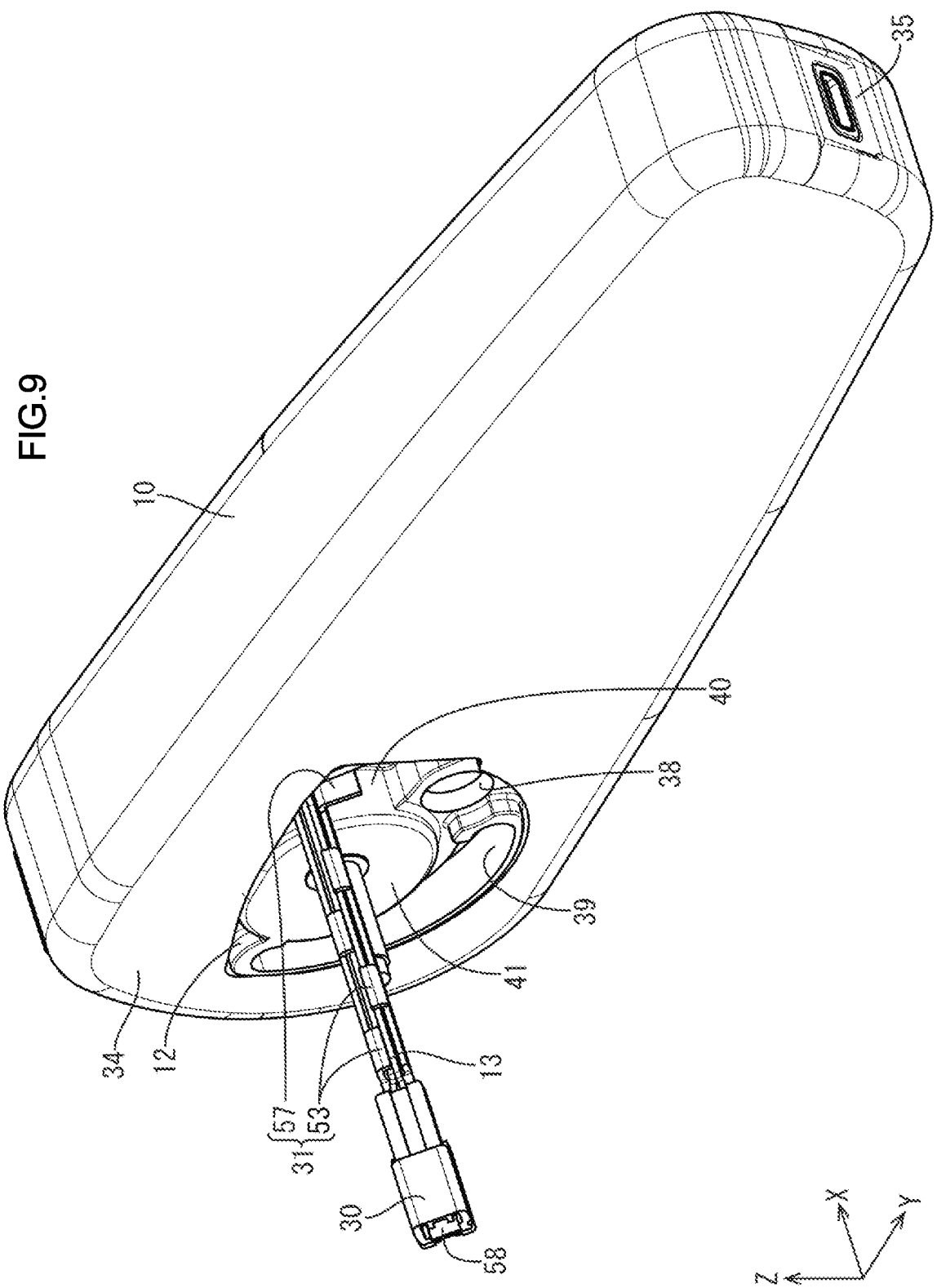
FIG. 9 is a perspective view illustrating an armrest.

As illustrated in FIG. 9, the armrest 10 extends in the front-rear direction. The armrest 10 is slightly tapered toward a front end section thereof from a rear end section. The rear end section of the armrest 10 has a round shape in a border section between an upper surface section and a rear surface section and in a border section between the rear surface section and a lower surface section.

The armrest 10 includes a skin 34 that has a substantially bag shape, the frame 12 that is inside the skin 34, and a foaming resin (not illustrated) that is filled within the skin 34. The skin 34 is made of fabric, leather or other material.

The armrest 10 includes a first socket 35 in a front end section thereof and the first socket 35 is not covered with the skin 34 (refer to FIG. 9). The armrest 10 includes a second socket 36 in a rear end section thereof and the second socket 36 is not covered with the skin 34 (refer to FIG. 2). The first socket 35 and the second socket 36 are USB ports in which USB (universal serial bus) connectors to be connected to the portable devices are plugged. Each of the first socket 35 and the second socket 36 is connected to the armrest-side wire harness 13.

Frame 12

Figure 10:
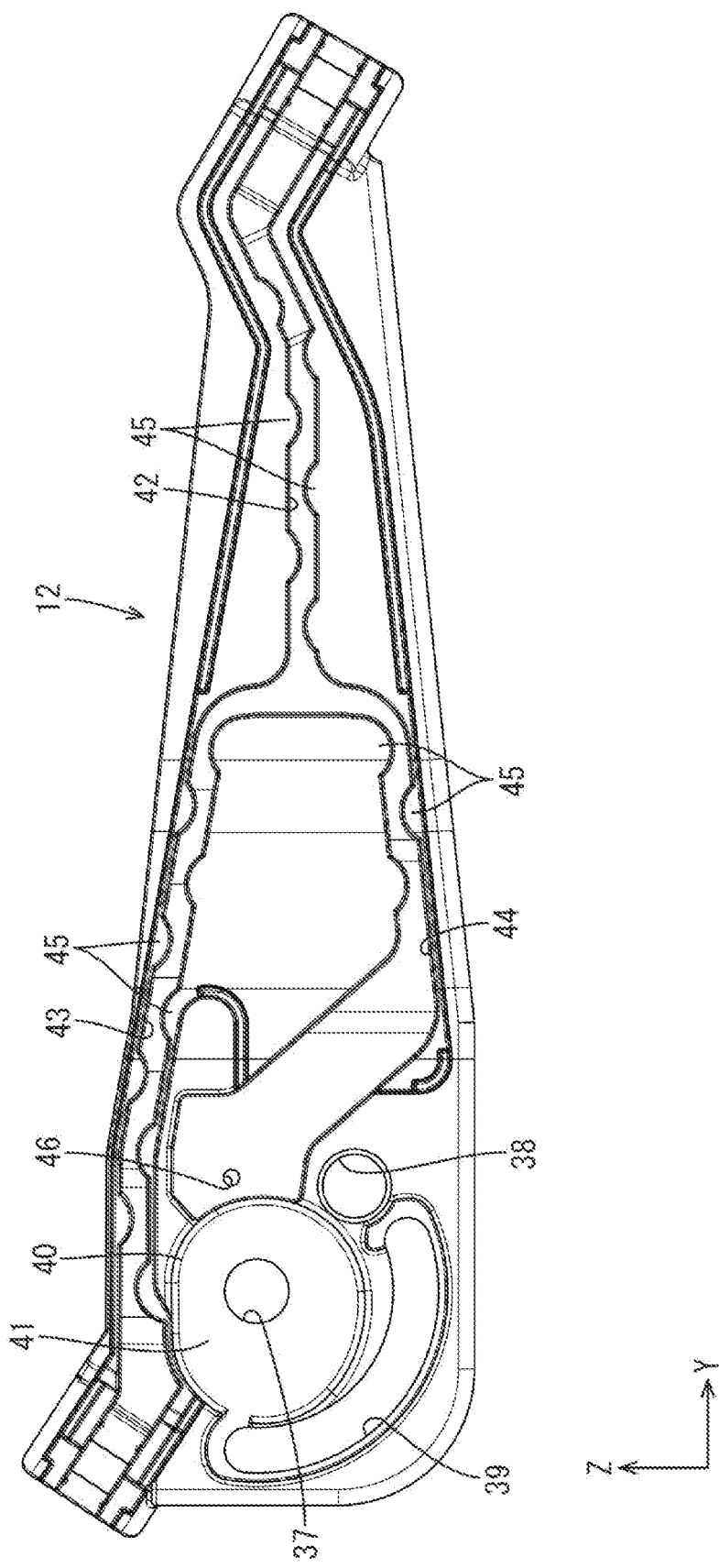
FIG. 10 is a side view illustrating a frame.

As illustrated in FIG. 10, the frame 12 is made of synthetic resin and molded into a predefined form with injection molding. The frame 12 has a long shape in the front-rear direction and is slightly tapered toward the front end section from the rear end section. The frame 12 has a relatively flat shape with respect to the right-left direction.

The frame 12 includes a mounting hole 37 in the rear end section thereof. The mounting hole 37 extends in the right-left direction and for mounting the armrest 10 on the seat 11. A bolt 25 is inserted through the mounting hole 37 and fastened to the seat 11 (refer to FIG. 15).

The frame 12 includes an injection hole 38 in a section thereof that is on an obliquely lower and front side with respect to the mounting hole 37. The injection hole 38 is through the frame 12 with respect to the right-left direction and is for injecting the foaming resin. A nozzle, which is not illustrated, is inserted in the injection hole 38 and foaming material is injected to the inside of the skin 34 through the nozzle.

The frame 12 includes a guide recess 39 in a section thereof that is an obliquely lower and rear side with respect to the mounting hole 37. The guide recess 39 has an arched shape extending around the mounting hole 37 and the guide pin 29 of the bracket 23 is put in the guide recess 39. The guide recess 39 has a width dimension that is same as or slightly greater than a diameter of the guide pin 29.

The frame 12 includes a mounting portion 40 around the mounting hole 37. The mounting portion 40 has a long circular shape elongated in the front-rear direction seen from the right-left direction and is attached to the bracket 23. The mounting portion 40 has a mounting surface 41 that is opposite the bracket 23 and slides along the mount wall 24 of the bracket 23. The mounting surface 41 of the mounting portion 40 is not covered with the skin 34.

The frame 12 includes a first recess 42, a second recess 43, and a third recess 44 in which the armrest-side wire harness 13 is arranged. The first recess 42 extends rearward from a rear end of the first socket 35. The second recess 43 extends frontward from a lower end of the second socket 36 and is bent downward in a front end section thereof. The third recess 44 extends downward from a joint section where the rear end of the first recess 42 and an end of the downward bent section of the second recess 43 join. A rear end section of the third recess 44 is bent obliquely upward and rearward and extends to a section that is obliquely upward and on a front side with respect to the mounting hole 37.

The first recess 42, the second recess 43, and the third recess 44 include a pair of side walls and an opening. The walls include holding projections 45 at opening edges thereof and the holding projections 45 project from one of the walls toward the other one. The walls include the holding projections 45 alternately in a zig zag manner in an extending direction of the first recess 42, the second recess 43, and the third recess 44 seen from the above. The holding projections 45 hold the armrest-side wire harness 13 and the armrest-side wire harness 13 is less likely to come off from the first recess 42, the second recess 43, and the third recess 44.

Figure 11:
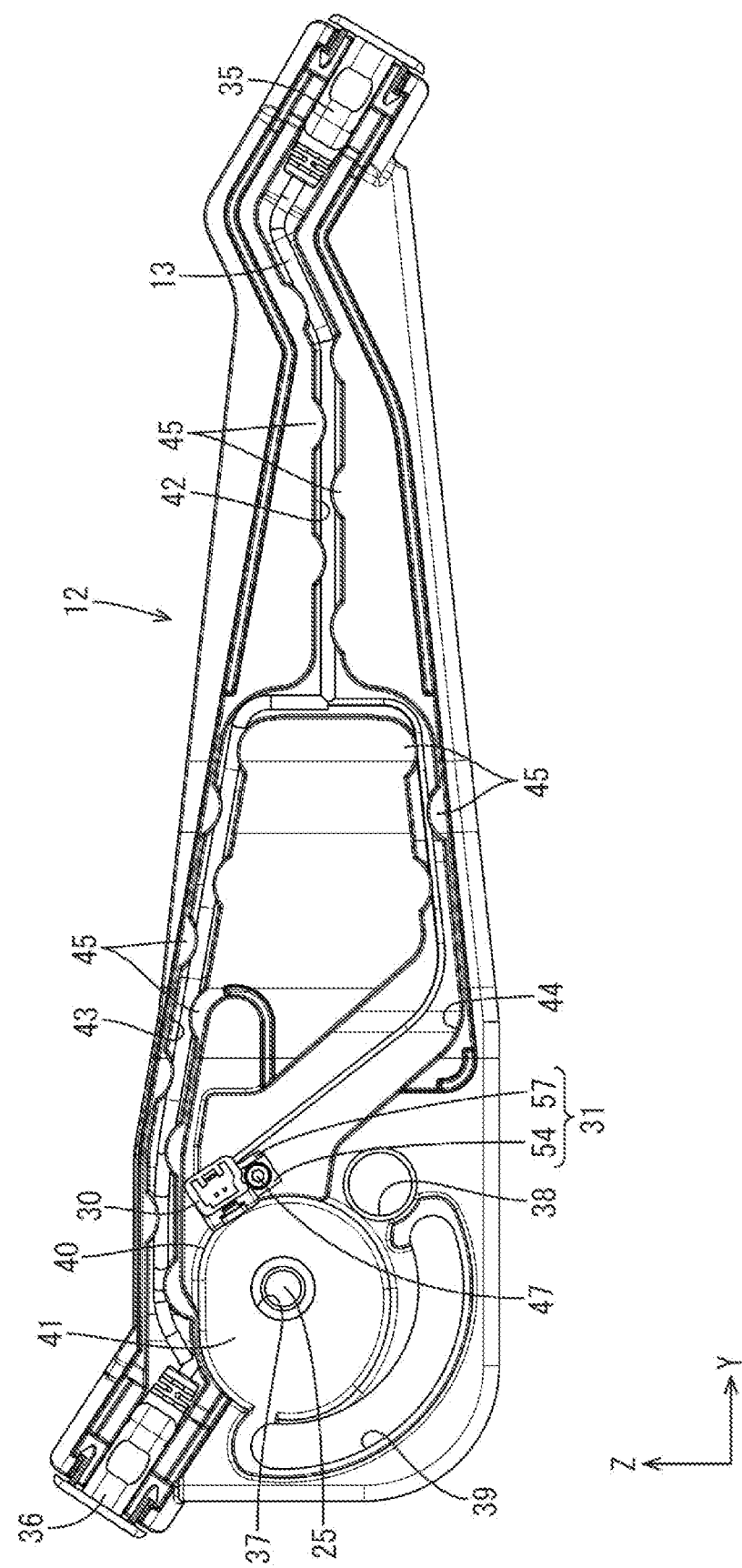
FIG. 11 is a side view illustrating the frame including an armrest-side wire harness, a protector, and an armrest-side connector.

As illustrated in FIG. 11, the armrest-side wire harness 13 extends from each of the first socket 35 and the second socket 36 and has a joint section at the end of the third recess 44 and is routed in the third recess 44 to the section that is obliquely upward and on a front side with respect to the mounting hole 37.

The third recess 44 includes a through hole 46 in a rear end section thereof and the through hole 46 is through the third recess 44 in the right-left direction. A screw 47 is inserted through the through hole 46 such that the protector 31, which will be described later, is fixed to the frame 12 (refer to FIG. 16).

Protector 31

Figure 12:
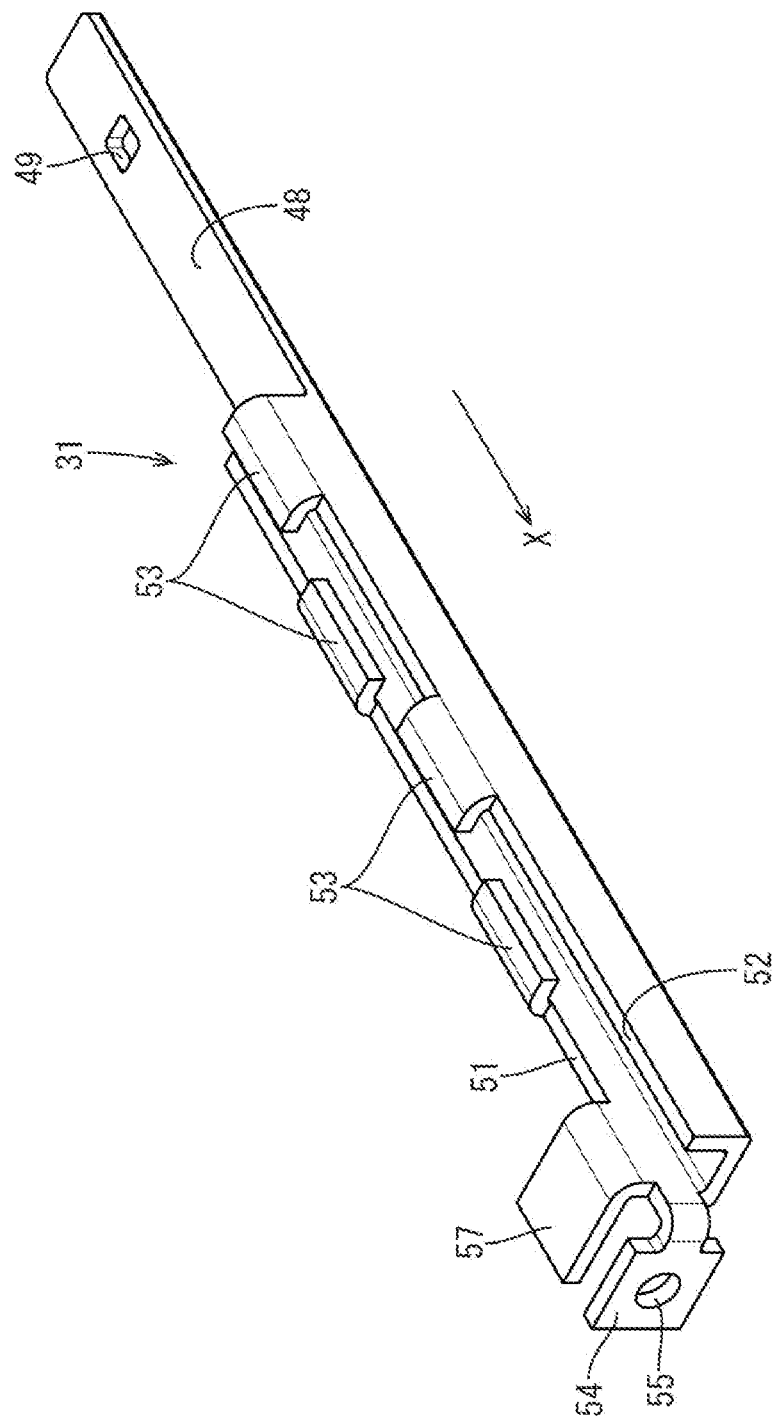
FIG. 12 is a perspective view illustrating the protector.
Figure 13:
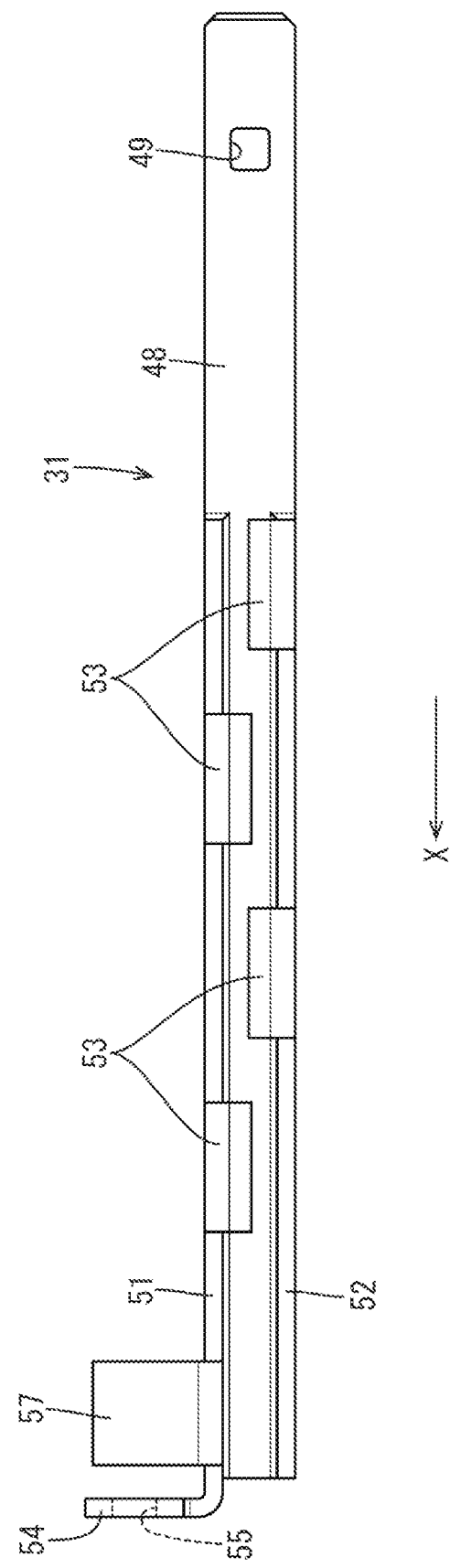
FIG. 13 is a plan view illustrating the protector.
Figure 14:
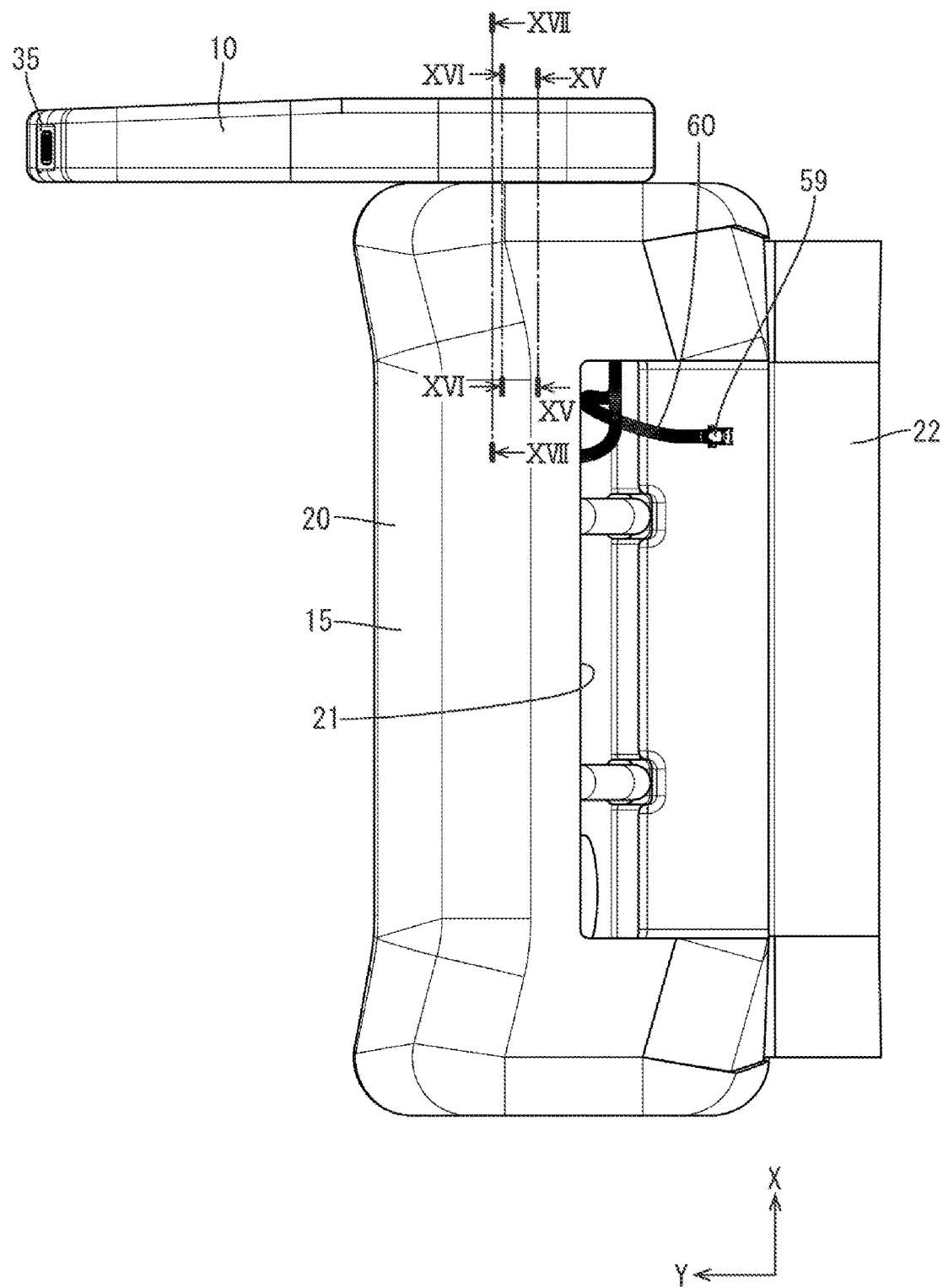
FIG. 14 is a bottom view illustrating the backrest in which the back cover is lifted upward and the opening hole is open.
Figure 15:
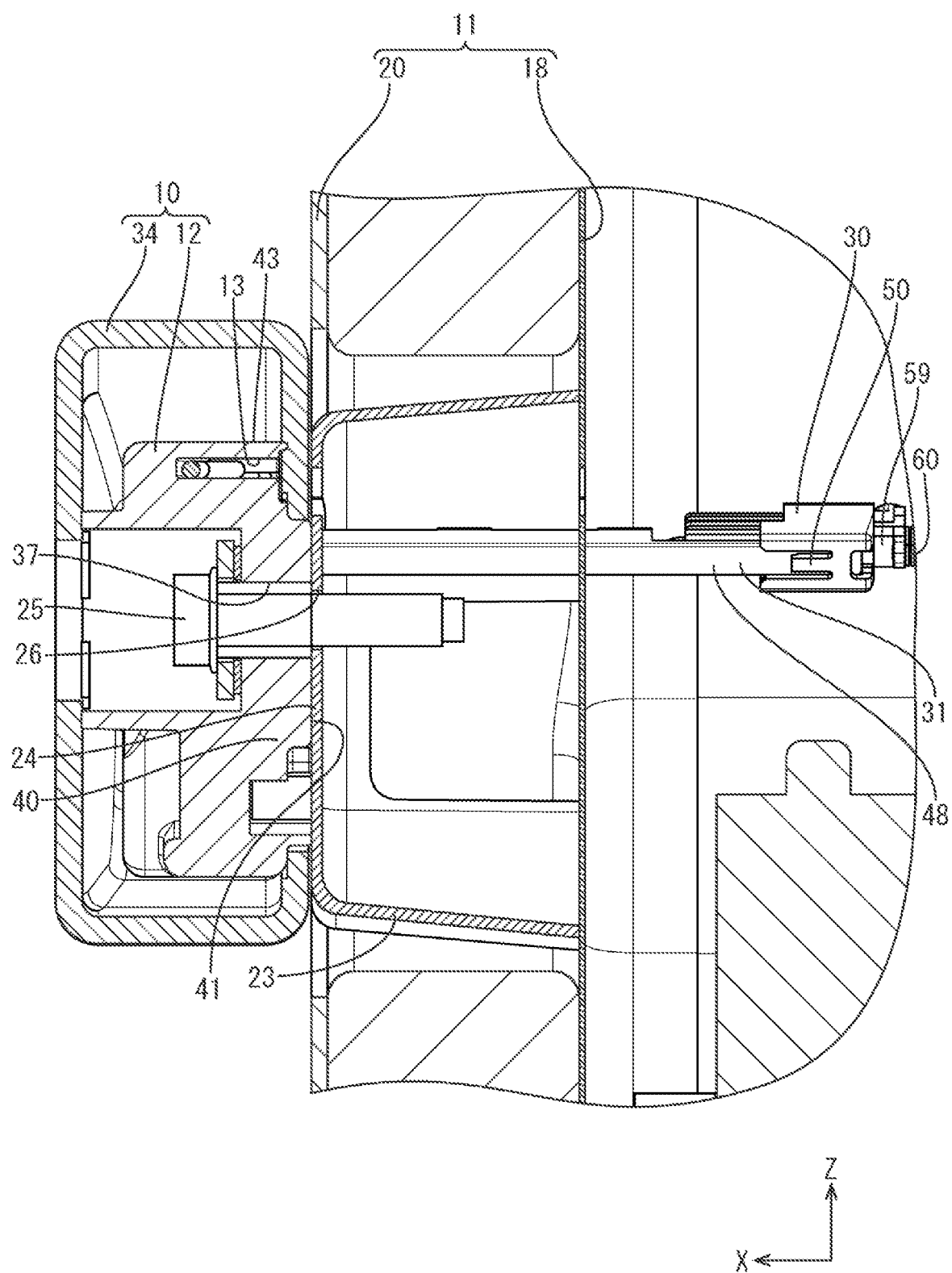
FIG. 15 is a cross-sectional view taken along XV-XV line in FIG. 14.
Figure 16:
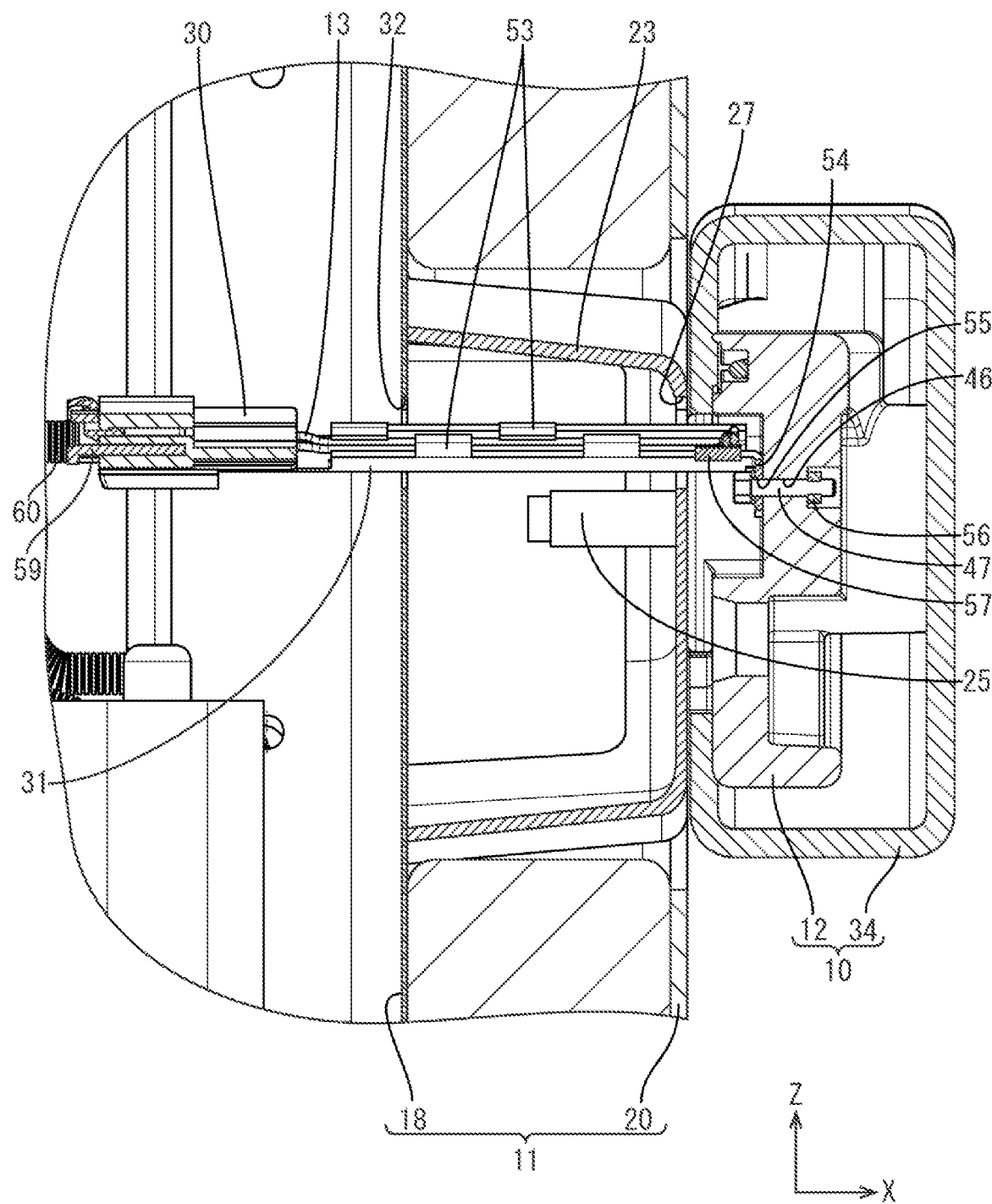
FIG. 16 is a cross-sectional view taken along XVI-XVI line in FIG. 14.

The protector 31 is attached to the rear end section of the third recess 44. The protector 31 projects from the mounting surface 41 to be closer to the bracket 23 (in the right direction). As illustrated in FIGS. 12 and 13, the protector 31 is obtained by pressing a metal plate into a predefined form. The protector 31 has a thin and long shape elongated in the right-left direction.

The protector 31 includes a bottom wall 48 extending in the right-left direction. The bottom wall 48 includes a connector holding hole 49 in a right end section thereof. The connector holding hole 49 is through the bottom wall 48 and the armrest-side connector 30 is to be fitted therein. A stopper 50 of the armrest-side connector 30 is inserted in the connector holding hole 49 and stopped by a hole edge of the connector holding hole 49. Thus, the armrest-side connector 30 is fitted in the right end portion (corresponding to a projecting end portion) of the protector 31.

The protector 31 includes a first side wall 51 and a second side wall 52 in a two-third of an entire area of the bottom wall 48 from the left end with respect to the right-left direction. The first side wall 51 and the second side wall 52 extend upward from two side edges of the bottom wall 48, respectively. The bottom wall 48, the first side wall 51, and the second side wall 52 define a recess and the armrest-side wire harness 13 is routed in the recess. The first side wall includes stopper pieces 53 extending from a distal end thereof toward the second side wall 52. The second side wall 52 includes the stopper pieces 53 extending from a distal end thereof toward the first side wall 51. The stopper pieces 53 of the first side wall 51 and the stopper pieces 53 of the second side wall 52 are alternately arranged in an extending direction of the protector 31 (the right-left direction). The stopper pieces 53 of the first side wall 51 and the stopper pieces 53 of the second side wall 52 hold the armrest-side wire harness 13 and the armrest-side wire harness 13 is less likely to come off from the recess of the protector 31.

The first side wall 51 includes a fixing portion 54 at a left end thereof. The fixing portion 54 is bent vertically from the first side wall 51 and extends away from the second side wall 52. The fixing portion 54 has a square shape seen from the right-left direction. The fixing portion 54 includes an insertion hole 55 through which the screw 47 is inserted. The screw 47 is inserted in the insertion hole 55 and the through hole 46 while the insertion hole 55 of the fixing portion 54 and the through hole 46 of the third recess 44 corresponding to each other, and the screw 47 is fastened to a nut 56. Thus, the fixing portion 54 is fixed to the frame 12.

Figure 18:
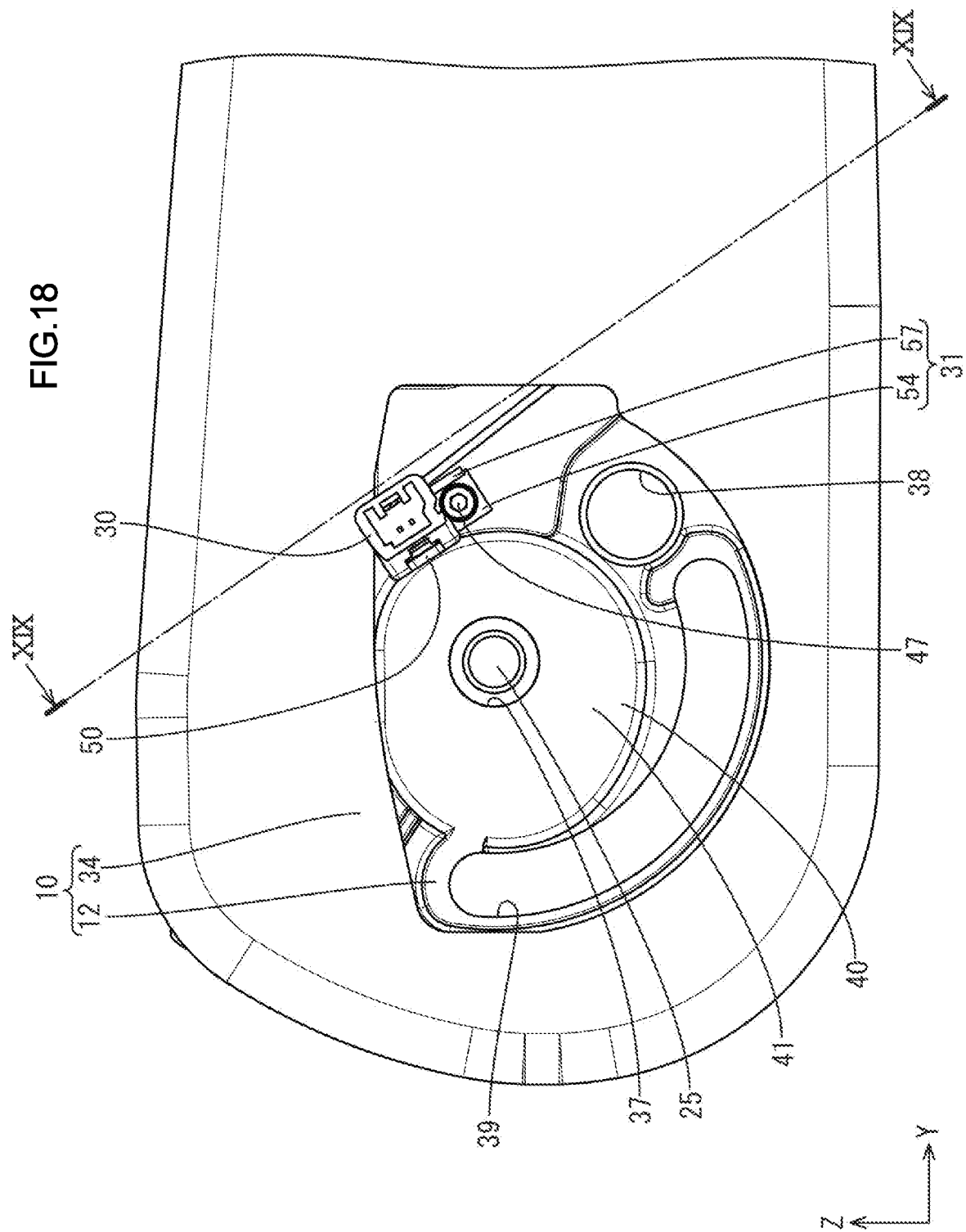
FIG. 18 is an enlarged side view illustrating a mounting portion of the armrest.
Figure 19:
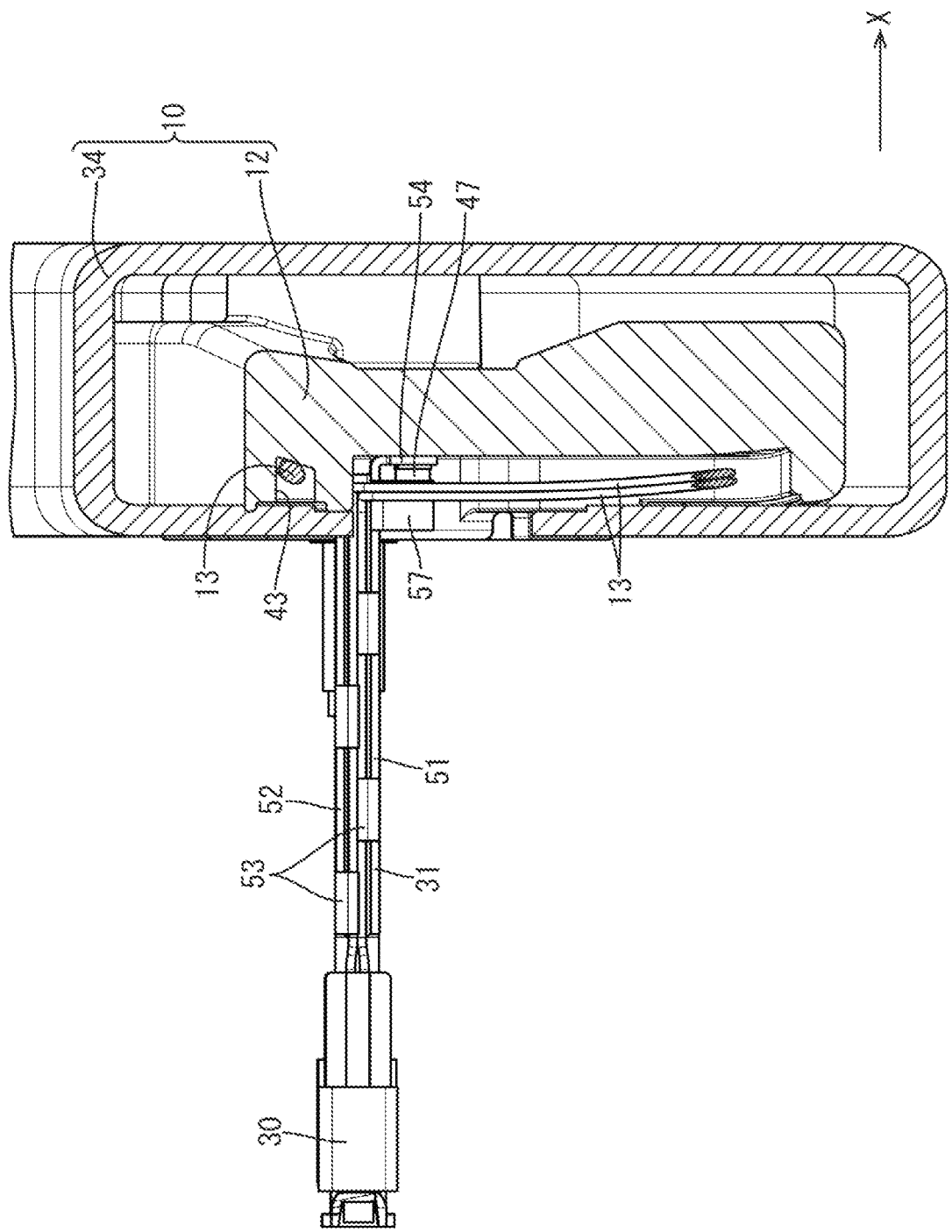
FIG. 19 is a cross-sectional view taken along XIX-XIX line in FIG. 18.

The first side wall 51 includes a wire harness protector 57 on a left end section thereof and on a right side with respect to the fixing portion 54. The wire harness protector 57 is bent vertically from the first side wall 51 and extends away from the second side wall 52. As illustrated in FIGS. 18 and 19, when the protector 31 is fixed to the frame 12, the wire harness protector 57 is between the armrest-side wire harness 13 and the screw 47 to protect the armrest-side wire harness 13 from contacting the screw 47.

Armrest-Side Connector 30

The armrest-side connector 30 is coupled to the left end of the armrest-side wire harness 13. The armrest-side connector 30 is made of insulating synthetic resin and molded with injection molding. The armrest-side connector 30 includes a hood 58 that is open toward a right side (in a direction to be closer to the bracket 23 from the mounting surface 41).

The armrest-side connector 30 includes the stopper 50 that is to be stopped by the hole edge of the connector holding hole 49 of the bottom wall 48 of the protector 31. The stopper 50 is stopped by the hole edge of the connector holding hole 49 and the armrest-side connector 30 is fitted in the protector 31.

The protector 31 extends through the mount wall 24 of the bracket 23 in the right-left direction and through the main frame 18 in the right-left direction while the mounting portion 40 of the armrest 10 being coupled to the bracket 23 by screwing with a bolt. With such a configuration, the bracket 23 extends from each of the two main frames 18 to the inside of the seat 11 with respect to the right-left direction. Namely, the armrest-side connector 30 that is inserted through a projected end portion of the bracket 23 is inside the seat 11.

Seat 11 Side Connector

Figure 17:
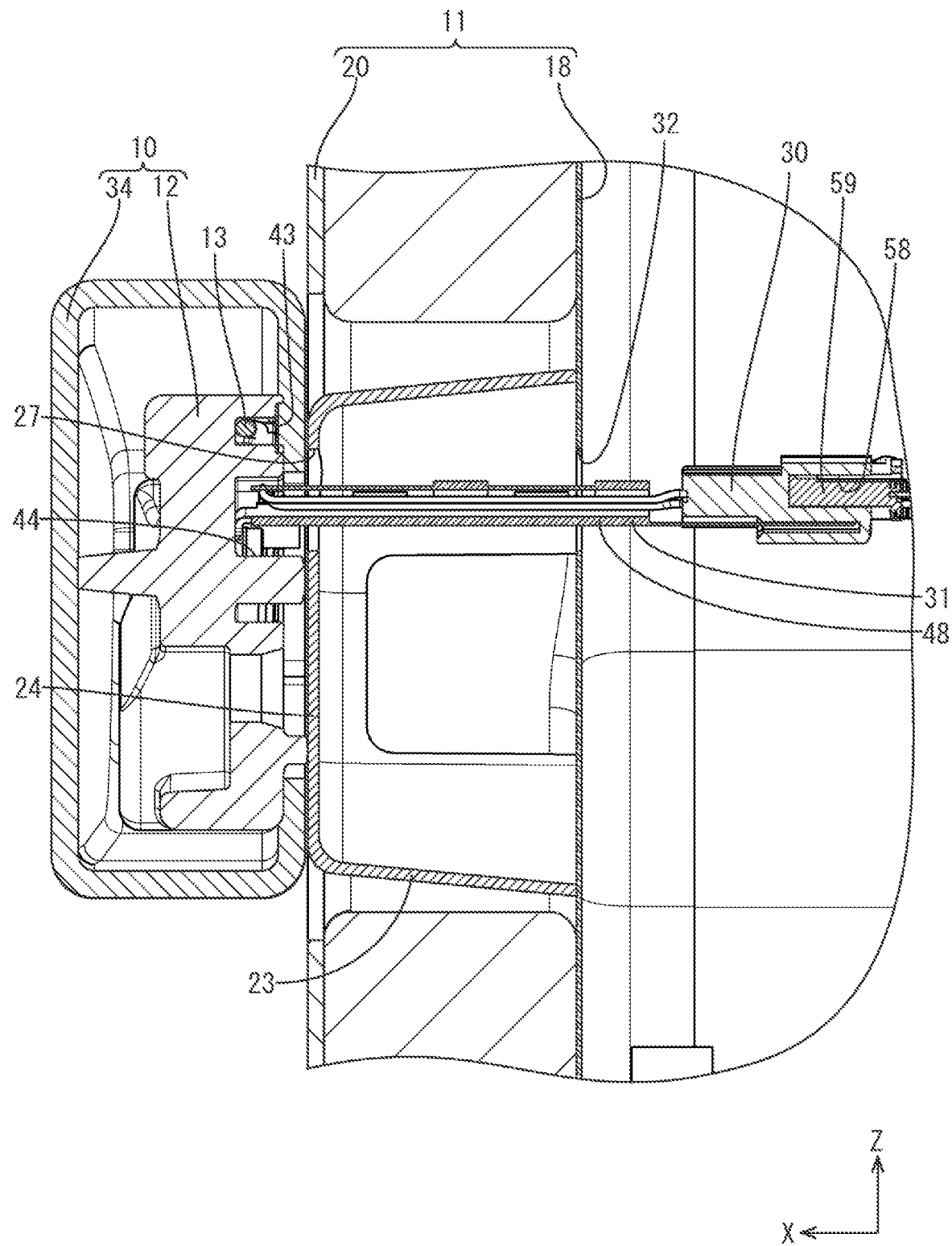
FIG. 17 is a cross-sectional view taken along XVII-XVII line in FIG. 14.

As illustrated in FIG. 17, a seat-side connector 59 is fitted in the hood 58 of the armrest-side connector 30. The seat-side connector 59 is made of insulating synthetic resin and molded with injection molding. The seat-side connector 59 is connected to a seat-side wire harness 60 at a left end thereof.

The seat-side wire harness 60 is routed inside the seat cover 20 and fixed to the main frame 18, the connection frame 19, and other components with a known method such as clips.

Process of Mounting Armrest 10 on Seat 11

Next, one example of a process of mounting the armrest 10 on the seat 11 will be described. The process of mounting the armrest 10 on the seat 11 is not limited to the one described below.

The frame 12 is formed with molding by injecting synthetic resin (refer to FIG. 10). The protector 31 is fixed to the frame 12 with the screw 47 and the nut 56.

The first socket 35, the second socket 36, and the armrest-side connector 30 are connected to the ends of the armrest-side wire harness 13. The armrest-side wire harness 13 is routed in the first recess 42, the second recess 43, and the third recess 44 of the frame 12. Furthermore, the armrest-side wire harness 13 is routed in the protector 31. The armrest-side connector 30 is fixed to the connector holding hole 49 of the protector 31 (refer to FIG. 11).

The frame 12 is covered with the skin 34. The nozzle is inserted in the injection hole 38 of the frame 12 and the foaming material is injected to the inside of the skin 34 and foamed. Accordingly, the armrest 10 is completed (refer to FIG. 9).

Next, the armrest-side connector 30 is inserted in the large circular portion 28 of the bracket-side long hole 27 in the bracket 23 from the left side (refer to FIG. 6) and further inserted in the large circular portion 33 of the main frame-side long hole 32 in the main frame 18 from the left side (refer to FIG. 7). Accordingly, the armrest-side connector 30 is arranged inside the main frame 18 in the right-left direction.

The bolt 25 is inserted in the mounting hole 37 and the bracket 23 and the mounting portion 40 are connected to each other to be relatively rotatable around the bolt 25. In the configuration, the guide pin 29 of the bracket 23 is arranged in the guide recess 39 of the frame 12. With such a configuration, the guide pin 29 is allowed to move within a range of the guide recess 39 and this allows the armrest 10 to be rotated.

Figure 20:
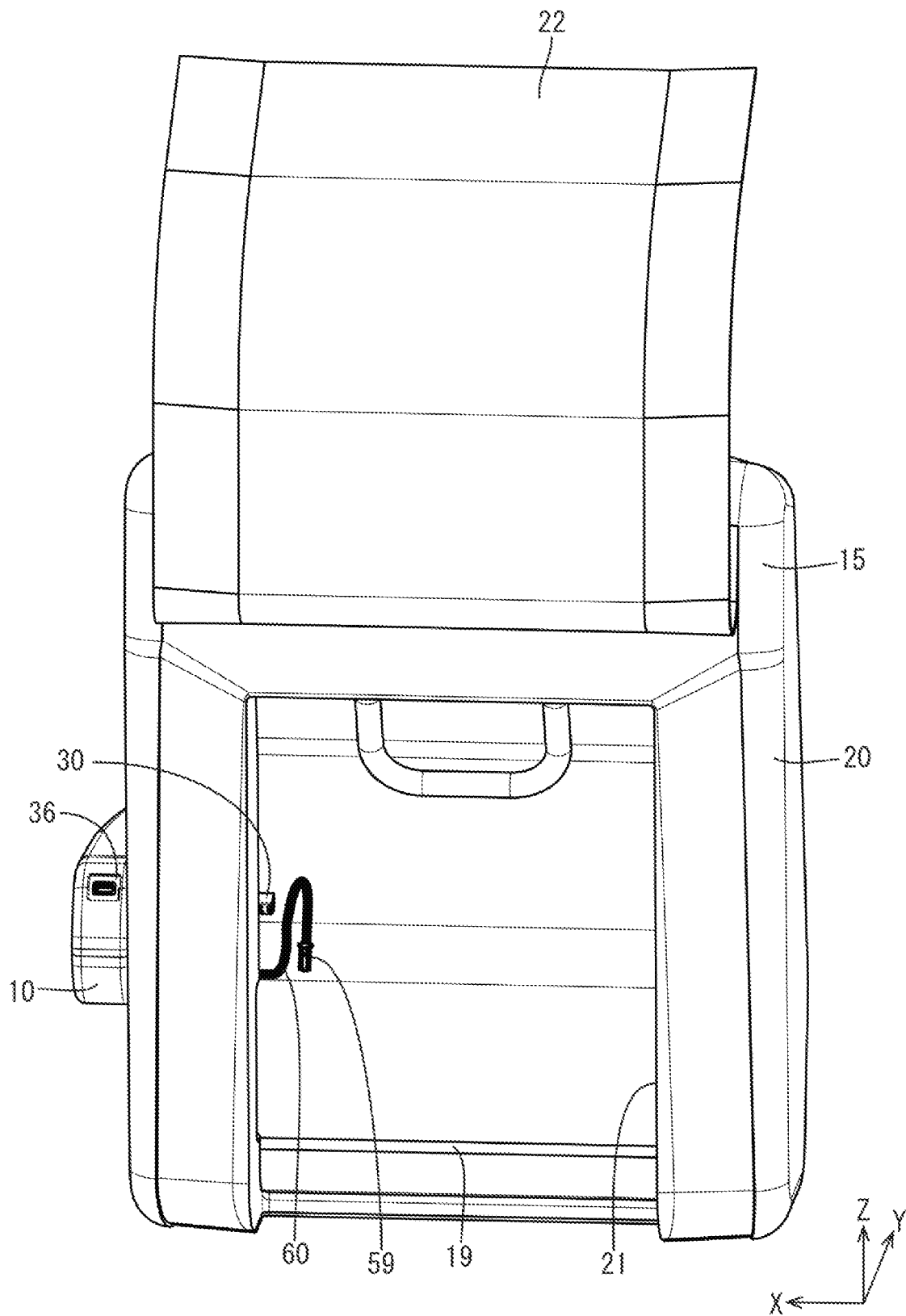
FIG. 20 is a perspective view illustrating the backrest in which the back cover is lifted upward and the opening hole is open before a seat-side connector and the armrest-side connector are connected.

Next, the fastener of the seat cover 20 is opened to lift the back cover 22 upward (refer to FIG. 20). This opens the opening hole 21. Inside the seat 11, the seat-side wire harness 60 is mounted on the main frame 18, the connection frame 19, and other components. The seat-side connector 59 that is connected to the end of the seat-side wire harness 60 is coupled to the armrest-side connector 30 that is inside the seat 11 (refer to FIG. 3). Accordingly, the seat-side wire harness 60 and the armrest-side wire harness 13 are electrically connected to each other.

The back cover 22 is put down and the fastener is closed. Accordingly, the opening hole 21 is covered with the back cover 22 (refer to FIG. 2). Then, the seat 11 is completed.

Next, operations and advantageous effects of this embodiment will be described. The armrest 10 according to this embodiment is the armrest 10 to be mounted on the seat 11 of a vehicle. The armrest 10 includes the frame 12, the mounting portion 40, the armrest-side wire harness 13, and the armrest-side connector 30. The mounting portion 40 is included in the frame 12 and includes the mounting surface 41 with which the mounting portion 40 is attached to the bracket 23 of the seat 11. The armrest-side wire harness 13 is routed in the frame 12. The armrest-side connector 30 is connected to the armrest-side wire harness 13 and is open in a direction from the mounting surface 41 toward the bracket 23.

According to the above configuration, after the mounting portion 40 is attached to the bracket 23 of the seat 11, the armrest-side connector 30, which is open in a direction from the mounting surface 41 toward the bracket 23, and the seat-side connector 59, which is connected to the seat-side wire harness 60 arranged in the seat 11, are connected to each other inside the seat 11. This improves operability of connecting the wire harness to the armrest 10.

According to this embodiment, the protector 31 is fixed to the frame 12 to project from the mounting surface 41 toward the bracket 23. The armrest-side wire harness 13 is routed in the protector 31 and the armrest-side connector 30 is on the projected end portion of the protector 31.

According to the above configuration, the protector 31 protects the armrest-side wire harness 13 that extends toward the bracket 23.

According to this embodiment, the protector 31 is made of metal.

According to the above configuration, the protector 31 is increased in strength compared to the protector 31 made of synthetic resin. Therefore, the armrest-side wire harness 13 can be surely protected.

The protector 31 includes the bottom wall 48, and the first side wall 51 and the second side wall 52 that extends upward from side edges of the bottom wall 48, respectively. One of the first side wall 51 and the second side wall 52 includes stopper pieces 53 extending from a distal end thereof toward the other one of the side walls. The stopper pieces 53 hold the armrest-side wire harness 13 such that the armrest-side wire harness 13 is less likely to come off from the protector 31.

According to the armrest 10 including the above configuration, the bottom wall 48, the first side wall 51, and the second side wall 52 surely protect the armrest-side wire harness 13. The stopper pieces 53 suppress the armrest-side wire harness 13 from coming off from the protector 31 and the armrest-side wire harness 13 is surely protected.

According to this embodiment, the protector 31 that projects from the mounting surface 41 toward the bracket 23 is fixed to the frame 12 and the protector 31 is arranged inside the seat 11 when the mounting portion 40 is attached to the bracket 23. The armrest-side wire harness 13 is routed in the protector 31 and the armrest-side connector 30 is attached to the projecting end portion of the protector 31.

According to the above configuration, the armrest-side connector 30 can be surely arranged inside the seat 11 while the mounting portion 40 being attached to the bracket 23 of the seat 11. Accordingly, the seat-side wire harness 60 and the armrest-side wire harness 13 can be surely connected to each other inside the seat 11. This further improves operability of connecting the wire harness to the armrest 10.

The armrest-side wire harness 13 can be protected by the protector 31 that projects toward the bracket 23 and is inserted into the seat 11.

According to this embodiment, the protector 31 has a cross-sectional area taken along a surface thereof that is perpendicular to the projecting direction of the protector 31 and the cross-sectional area of the protector 31 is smaller than a cross-sectional area of the connector.

According to the above configuration, the bracket 23 can be increased in strength and the reasons thereof will be described below. The bracket 23 of the seat 11 includes the bracket-side long hole 27 through which the protector 31 and the armrest-side connector 30 are to be inserted. The bracket-side long hole 27 includes a portion (the large circular portion 28) through which the protector 31 and the armrest-side connector 30 can be inserted and that has a cross-sectional area greater than a cross-sectional area of the armrest-side connector 30. The bracket-side long hole 27 includes a portion (a portion of the bracket-side long hole 27 other than the large circular portion 28) through which only the protector 31 can be inserted and that has a cross-sectional area greater than a cross-sectional area of the protector 31 and smaller than that of the armrest-side connector 30. According to such a configuration, in the configuration that the armrest 10 is rotatably mounted on the bracket 23, the cross-sectional area of the bracket-side long hole 27 in the bracket 23 can be reduced compared to a configuration including the protector 31 and the armrest-side connector 30 both having the same cross-sectional area. This increases the strength of the bracket 23.

Second Embodiment

Next, a second embodiment of the technology described herein will be described with reference to FIGS. 21 to 26.

Figure 22:
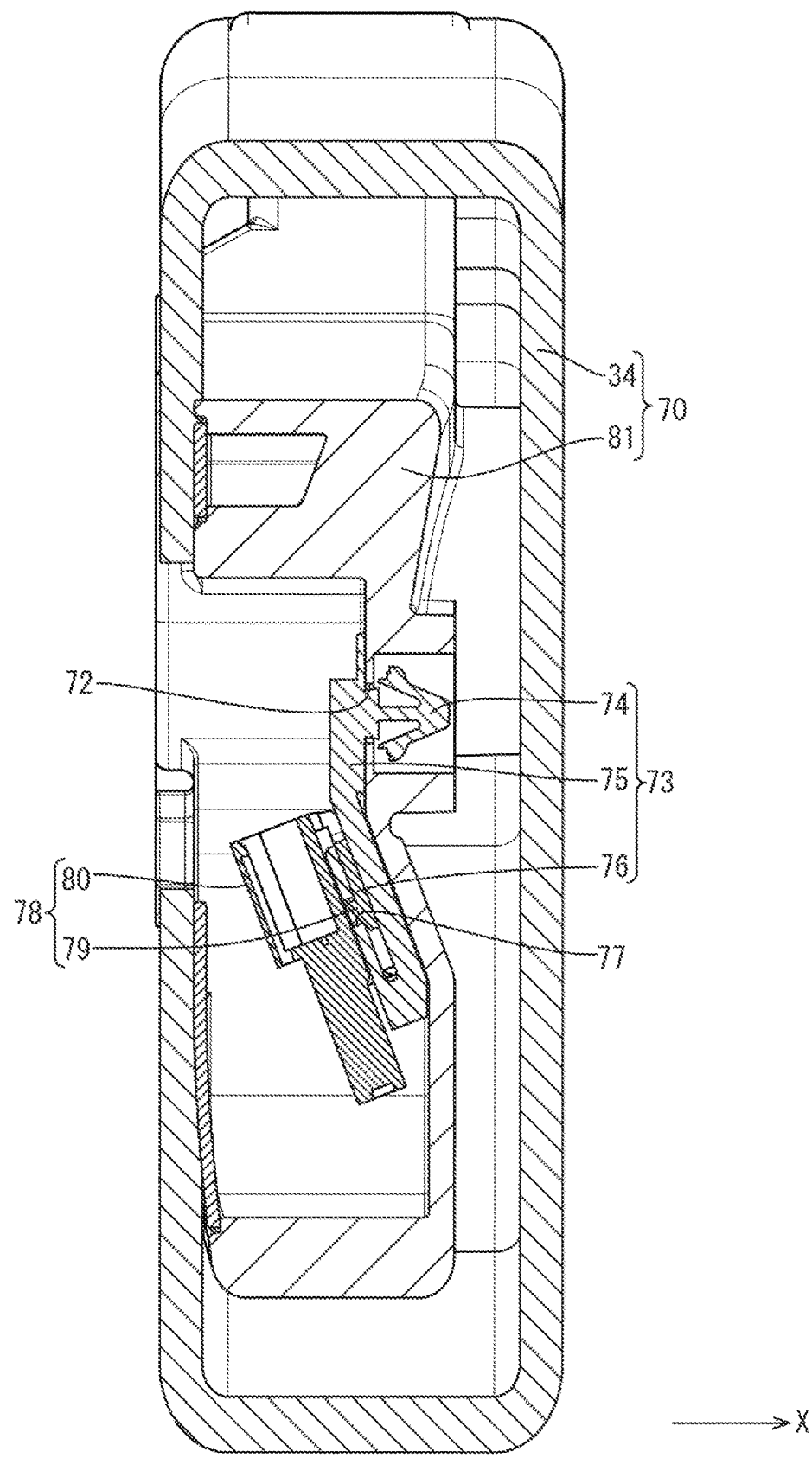
FIG. 22 is a cross-sectional view taken along XXII-XXII line in FIG. 21.

The bottom wall of the third recess 44 is slightly tilted rightward as it extends toward the rear end (refer to FIG. 22). The bottom wall of the third recess 44 includes a fitting hole 72 in the rear end portion thereof and the fitting hole 72 is through the bottom wall. A fitting portion 74 of a connector holding member 73 is inserted in the fitting hole 72 (refer to FIG. 25). The fitting portion 74 of the connector holding member 73 is elastically fitted to a hole edge of the fitting hole 72 and the connector holding member 73 is attached to a frame 81.

Figure 23:
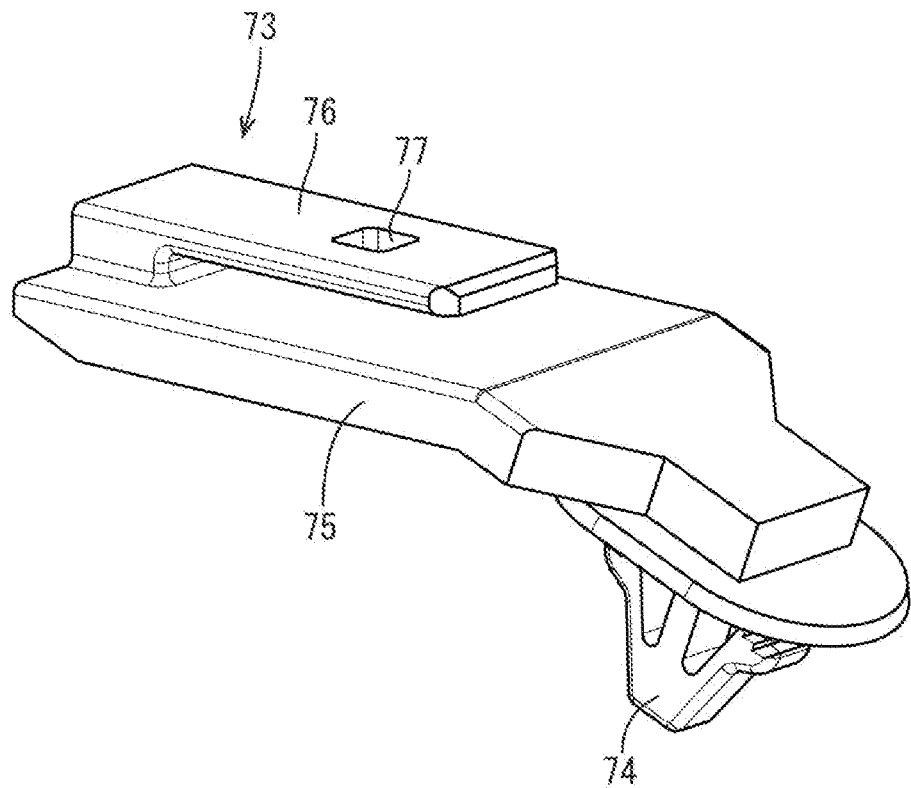
FIG. 23 is a perspective view illustrating a connector holding member.
Figure 24:
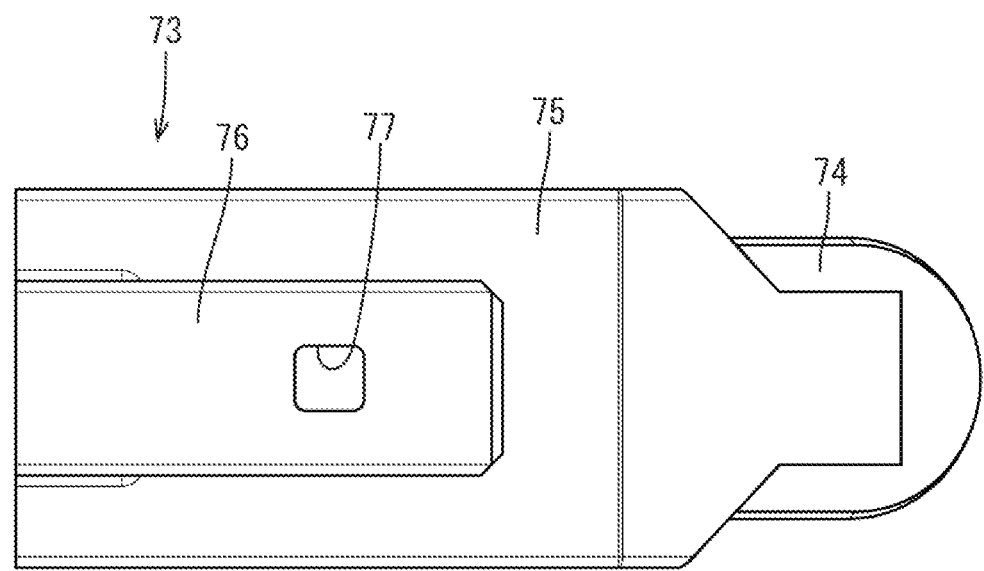
FIG. 24 is a plan view illustrating the connector holding member.

As illustrated in FIGS. 23 and 24, the connector holding member 73 includes the fitting portion 74 and a body member 75 that extends from the fitting portion 74 along the bottom wall of the third recess 44. The body member 75 is tilted at an angle corresponding to an angle at which the bottom wall of the third recess 44 is tilted. Accordingly, the body member 75 of the connector holding member 73 extends along the bottom wall of the third recess 44 as a whole.

The body member 75 includes a connector holding piece 76 on an end portion opposite from an end portion thereof including the fitting portion 74. The connector holding piece 76 extends from a right side surface of the body member 75 toward the fitting portion 74 so as to be folded back from the right side surface. The connector holding piece 76 is narrower than the body member 75. The connector holding piece 76 includes a connector holding hole 77 in an extending end section thereof. The connector holding hole 77 is through the connector holding piece 76 and is for holding an armrest-side connector 78. A stopper 79 of the armrest-side connector 78 is stopped by a hole edge of the connector holding hole 77 such that the armrest-side connector 78 is attached to an armrest 70 via the connector holding member 73.

Figure 21:
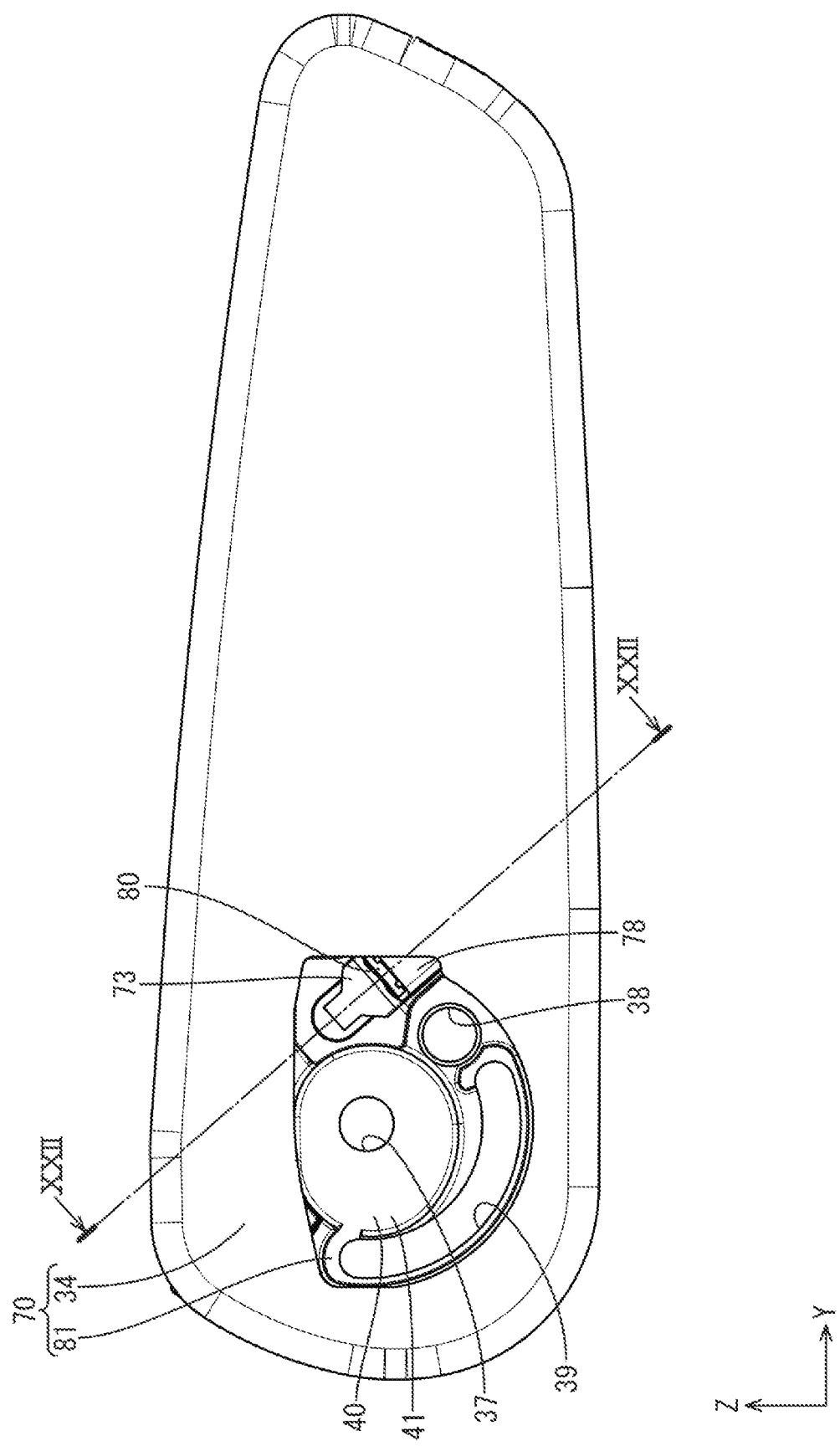
FIG. 21 is a side view illustrating an armrest according to a second embodiment.
Figure 26:
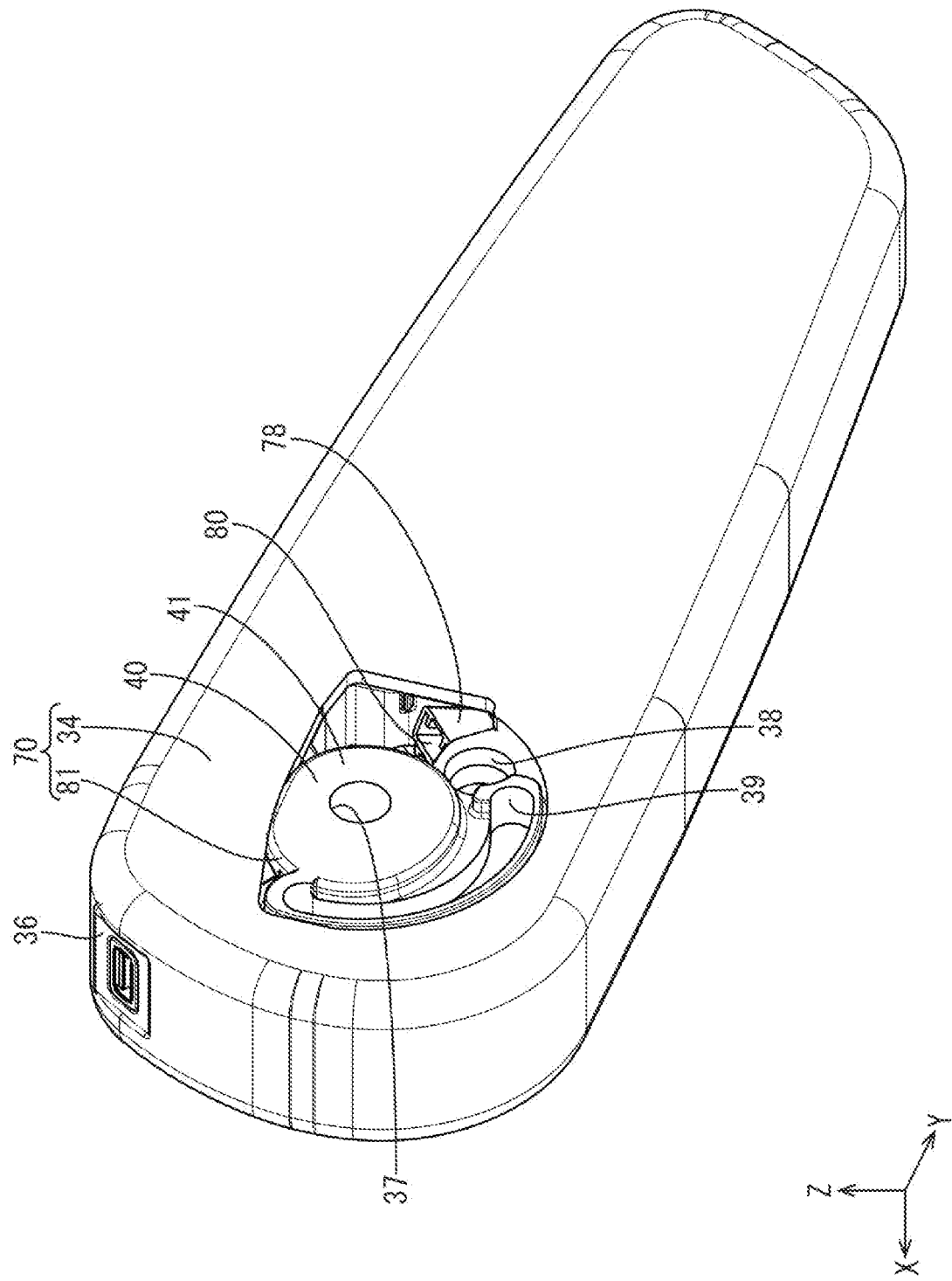
FIG. 26 is a perspective view illustrating the armrest according to the second embodiment.

As illustrated in FIGS. 21 and 26, a hood 80 of the armrest-side connector 78 is not covered with the skin 34 of the armrest 70. The hood 80 is open rightward. Namely, the hood 80 is open in a direction from the mounting surface 41 of the frame 81 toward the bracket 23.

Configurations other than the above configurations are substantially same as those of the first embodiment and components same as those in the first embodiment are indicated by the same symbols and will not be described.

The armrest 70 according to this embodiment includes the frame 81, the mounting portion 40, the armrest-side wire harness 13, and the armrest-side connector 78. The mounting portion 40 is included in the frame 81 and includes the mounting surface 41 with which the mounting portion 40 is attached to the bracket 23. The armrest-side wire harness 13 is routed in the frame 81. The armrest-side connector 78 is connected to the armrest-side wire harness 13 and is open in a direction from the mounting surface 41 toward the bracket 23.

According to the above configuration, after the mounting portion 40 is attached to the bracket 23, the armrest-side connector 78, which is open in a direction from the mounting surface 41 toward the bracket 23, and the seat-side connector 59, which is connected to the seat-side wire harness 60 arranged in the seat 11, are connected to each other. This improves operability of connection to the armrest-side wire harness 13 arranged in the armrest 10.

Other Embodiments

The technology disclosed herein is not limited to the embodiments described above and illustrated in the drawings. For example, the following embodiments will be included in the technical scope of the technology.

Figure 27:
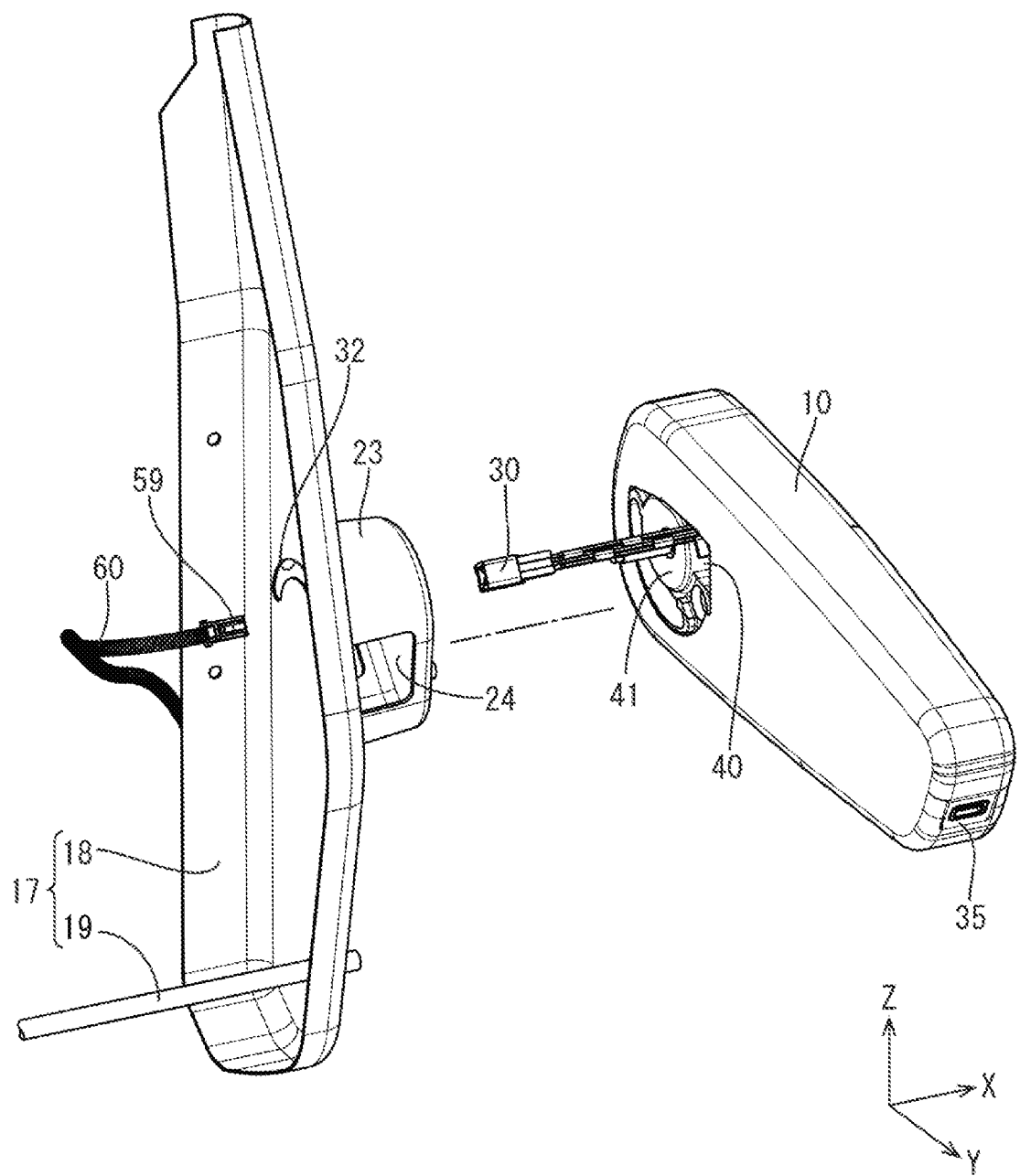
FIG. 27 is an enlarged perspective view illustrating an armrest and a bracket before the armrest is mounted on the bracket according to another embodiment (1).
Figure 28:
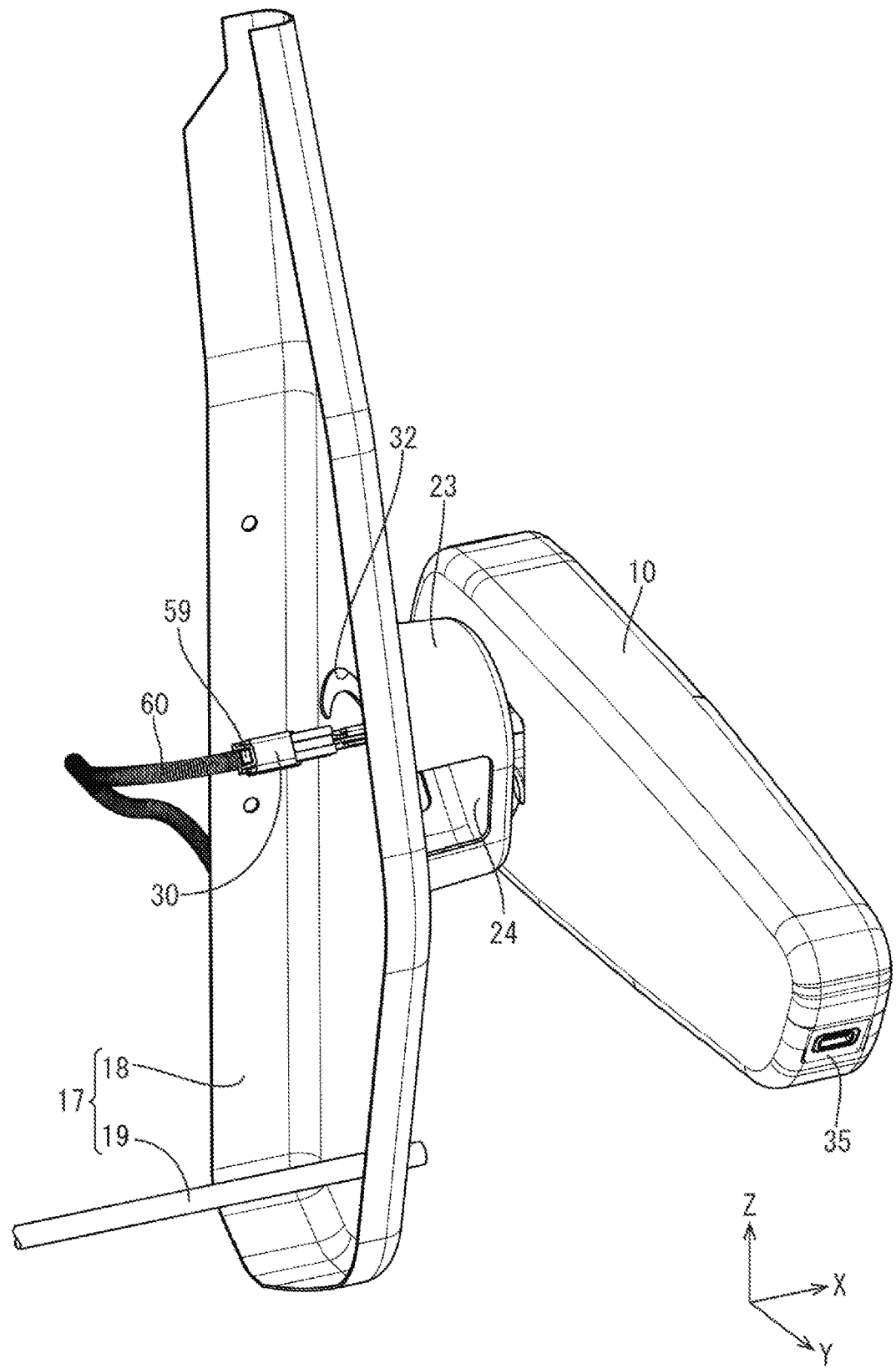
FIG. 28 is an enlarged perspective view illustrating the armrest and the bracket according to another embodiment (1) after the armrest is mounted on the bracket and an armrest-side connector and a seat-side connector are connected.

(1) As illustrated in FIGS. 27 and 28, the seat-side connector 59 and the seat-side wire harness 60 may be previously fixed to the main frame 18 in predefined positions with clips, which are not illustrated, or other components. Accordingly, the armrest-side connector 30 and the seat-side connector 59 can be connected to each other in the process of mounting the armrest 10 on the bracket 23.

(2) The armrest 10, 70 may not to be mounted on the seat 11 of a vehicle but may be mounted on a seat of an aircraft, a ship, or a train. The armrest 10, 70 may not be mounted on the seat 11 but may be mounted on any component as necessary.

(3) The armrest 10, 70 may be mounted on two sides of the seat 11 or may be mounted on only one side of the seat 11.

(4) In the first embodiment, the frame 12 of the armrest 10 and the protector 31 are independent components but may be integrally formed as a unitary component. In such a configuration, the frame 12 and the protector 31 that are integrally formed may be made of metal or synthetic resin and the material can be appropriately selected.

(5) In the first embodiment, the cross-sectional area of the protector 31 is smaller than the cross-sectional area of the armrest-side connector 30. However, the cross-sectional area of the protector 31 may be same as or greater than the cross-sectional area of the armrest-side connector 30.

(6) In the first embodiment, the protector 31 has a recess form including the bottom wall 48, and the first side wall 51 and the second side wall 52 that extend upward from the side edges of the bottom wall 48. However, the protector 31 does not necessarily have the above configuration but may have a tubular form in which the armrest-side wire harness 13 is inserted. Furthermore, the protector 31 may have a thin and long plate shape and the protector 31 and the armrest-side wire harness 13 that is arranged along the protector 31 may be wrapped with adhesive tapes to fix the armrest-side wire harness 13 to the protector 31.

EXPLANATION OF SYMBOLS 10, 70: armrest
11: seat
12, 81: frame
13: armrest-side wire harness 23: bracket (one example of a mount member)
30, 78: armrest-side connector
31: protector
40: mounting portion
41: mounting surface
48: bottom wall
51: first side wall
52: second side wall
53: stopper piece

The invention claimed is:

1. An armrest comprising:
a frame;
a mounting portion included in the frame and having a mounting surface with which the mounting portion is mounted on a mount member;
an armrest-side wire harness arranged in the frame; and
an armrest-side connector connected to the armrest-side wire harness and being open in a direction from the mounting surface toward the mount member, wherein
the frame further includes a protector that projects from the mounting surface toward the mount member,
the armrest-side wire harness is arranged in the protector, and
the armrest-side connector is attached to a projecting end portion of the protector.

2. The armrest according to claim 1, wherein the protector is made of metal.

3. The armrest according to claim 1, wherein the protector has a cross-sectional area taken along a surface thereof that is perpendicular to a projecting direction of the protector and the cross-sectional area of the protector is smaller than a cross-sectional area of the armrest-side connector.

4. The armrest according to claim 1, wherein
the protector includes a bottom wall and two side walls extending upward from side edges of the bottom wall, respectively, and
one of the two side walls includes a stopper piece extending from a distal end of the one of the two side walls toward another one of the two side walls and the stopper piece is configured to hold the armrest-side wire harness.

5. An armrest to be mounted on a seat of a vehicle, the armrest comprising:
a frame;
a mounting portion included in the frame and having a mounting surface with which the mounting portion is mounted on a bracket of the seat;
an armrest-side wire harness arranged in the frame; and
an armrest-side connector connected to the armrest-side wire harness and being open in a direction from the mounting surface toward the bracket, wherein
the frame further includes a protector that projects from the mounting surface toward the bracket and is inserted in the seat while the mounting surface is being attached to the bracket,
the armrest-side wire harness is arranged in the protector, and
the armrest-side connector is attached to a projecting end portion of the protector.

6. The armrest according to claim 5, wherein the protector is made of metal.

7. The armrest according to claim 5, wherein the protector has a cross-sectional area taken along a surface thereof that is perpendicular to a projecting direction of the protector and the cross-sectional area of the protector is smaller than a cross-sectional area of the connector.

8. The armrest according to claim 5, wherein
the protector includes a bottom wall and two side walls extending upward from side edges of the bottom wall, respectively, and
one of the two side walls includes a stopper piece extending from a distal end of the one of the two side walls toward another one of the two side walls and the stopper piece is configured to hold the armrest-side wire harness.

* * * * *